US010556991B2

(12) United States Patent
Anderson et al.

(10) Patent No.: US 10,556,991 B2
(45) Date of Patent: Feb. 11, 2020

(54) BENZOXAZINE AND PHTHALONITRILE RESIN BLENDS

(71) Applicant: 3M INNOVATIVE PROPERTIES COMPANY, St. Paul, MN (US)

(72) Inventors: Benjamin J. Anderson, Eden Prairie, MN (US); Gregory P. Sorenson, Maplewood, MN (US); Ilya Gorodisher, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/772,108

(22) PCT Filed: Dec. 5, 2016

(86) PCT No.: PCT/US2016/064902
§ 371 (c)(1),
(2) Date: Apr. 30, 2018

(87) PCT Pub. No.: WO2017/105890
PCT Pub. Date: Jun. 22, 2017

(65) Prior Publication Data
US 2018/0312637 A1 Nov. 1, 2018

Related U.S. Application Data

(60) Provisional application No. 62/267,727, filed on Dec. 15, 2015.

(51) Int. Cl.
*C08K 5/315* (2006.01)
*C08G 73/06* (2006.01)
*C08G 14/06* (2006.01)
*C08L 79/04* (2006.01)
*C08L 79/02* (2006.01)

(52) U.S. Cl.
CPC ......... *C08G 73/0672* (2013.01); *C08G 14/06* (2013.01); *C08K 5/315* (2013.01); *C08L 79/02* (2013.01); *C08L 79/04* (2013.01)

(58) Field of Classification Search
CPC ................ C08K 5/315; C08K 5/357
See application file for complete search history.

(56) References Cited

U.S. PATENT DOCUMENTS

| | | | |
|---|---|---|---|
| 3,496,250 A | 2/1970 | Czerwinski | |
| 4,223,123 A | 9/1980 | Keller | |
| 4,408,035 A | 10/1983 | Keller | |
| 5,262,514 A | 11/1993 | Keller | |
| 5,350,828 A | 9/1994 | Keller | |
| 5,543,516 A | 8/1996 | Ishida | |
| 5,939,508 A | 8/1999 | Keller | |
| 6,207,786 B1 | 3/2001 | Ishida | |
| 7,041,772 B2 | 5/2006 | Aizawa | |
| 2011/0305883 A1* | 12/2011 | Kaimori | C08G 59/304 428/195.1 |

FOREIGN PATENT DOCUMENTS

| | | |
|---|---|---|
| CN | 103408755 | 11/2013 |
| CN | 103694191 | 4/2014 |
| CN | 103739519 | * 4/2014 |
| WO | WO 2014-179100 | 11/2014 |

OTHER PUBLICATIONS

Translation of CN 103739519 (2014) (Year: 2014).*
Brunovska, Journal of Applied Polymer Science, vol. 73, p. 2937-2949 (1999). (Year: 1999).*
Brunovska, "Thermal Study on the Copolymers of Phthalonitrile and Phenylnitrile-Functional Benzoxazines," Journal of Applied Polymer Science, 1999, vol. 73, No. 14, pp. 2937-2949.
Dominguez, "Low Melting Phthalonitrile Oligomers: Preparation, Polymerization and Polymer Properties," High Performance Polymers, 2006, vol. 18, No. 3, pp. 283-304.
Ghosh, "Polybenzoxazine-New High Performance Thermosetting Resins: Synthesis and Properties", Progress in Polymer Science, Aug. 2007, vol. 32, pp. 1344-1391.
Gorodisher, et al., "NMR Insights into Cationic Benzoxazine Polymerization Pathways," PMSE Div., Paper No. 121, 246th American Chemical Society National Meeting and Exposition, Sep. 8-12, 2013, Indianapolis, USA, 31 pages.
Ishida, "Synthesis and Characterization of Structurally Uniform Model Oligomers of Polybenzoxazine," Macromolecules, 1998, vol. 31 No. 8, pp. 2409-2418.
Kimura, "New Thermosetting Resin from Bisphenol A-Based Benzoxazine and Bisoxazoline", Journal of Applied Polymer Science, 1999, vol. 72, pp. 1551-1558.
Mckeown, The Synthesis of Symmetrical Phthalocyanines, The Porphyrin Handbook, 2003, vol. 15, pp. 61-124.
Ning, "Phenolic Materials via Ring-Opening Polymerization of Benzoxazines: Effect of Molecular Structure on Mechanical and Dynamic Mechanical Properties," Journal of Polymer Science: Part B: Polymer Physics, 1994, vol. 32, No. 5, pp. 921-927.
Rimdusit, "Development of New Class of Electronic Packaging Materials Based on Ternary Systems of Benzoxazine, Epoxy, and Phenolic Resins," Polymer, 2000, vol. 41, pp. 7941-7949.
Russell, "Study of the Characterization and Curing of Benzoxazines using $^{13}C$ Solid-State Nuclear Magnetic Resonance," Journal of Applied Polymer Science, 1998, vol. 70, No. 7, pp. 1413-1425.
Sharman, Synthesis of Phthalocyanine Precursors, The Porphyrin Handbook, 2003, pp. 1-60.
Wang, "Cationic Ring-Opening Polymerization of Benzoxazines," Polymer, 1999, vol. 40, No. 16, pp. 4563-4570.
Webb, et al., "NMR of Benzoxazine Oligomers and Polymers," PMSE Div., Paper No. 67, 246th American Chemical Society National Meeting and Exposition, Sep. 8-12, 2013, Indianapolis, USA, 24 pages.
Xu, "Design of Low Temperature Self Cured Phthalonitrile Based Polymers for Advanced Glass Fiber Composite Laminates," Journal of Materials Science, 2013, vol. 48, No. 23, pp. 8108-8116.

(Continued)

Primary Examiner — Robert C Boyle
(74) Attorney, Agent, or Firm — Adrian L. Pishko

(57) ABSTRACT

A resin blend is provided including a blend of a benzoxazine resin and a phthalonitrile resin. The benzoxazine/phthalonitrile resin blends prior to cure have more favorable processing and curing properties compared to the phthalonitrile resins alone, enabling greater ease in manufacturing.

13 Claims, 1 Drawing Sheet

(56) References Cited

OTHER PUBLICATIONS

International Search Report for PCT International Application No. PCT/US2016/064902, dated Feb. 22, 2017, 3 pages.
Partial human translation of CN 103739519 (2014) (Year: 2014).

\* cited by examiner

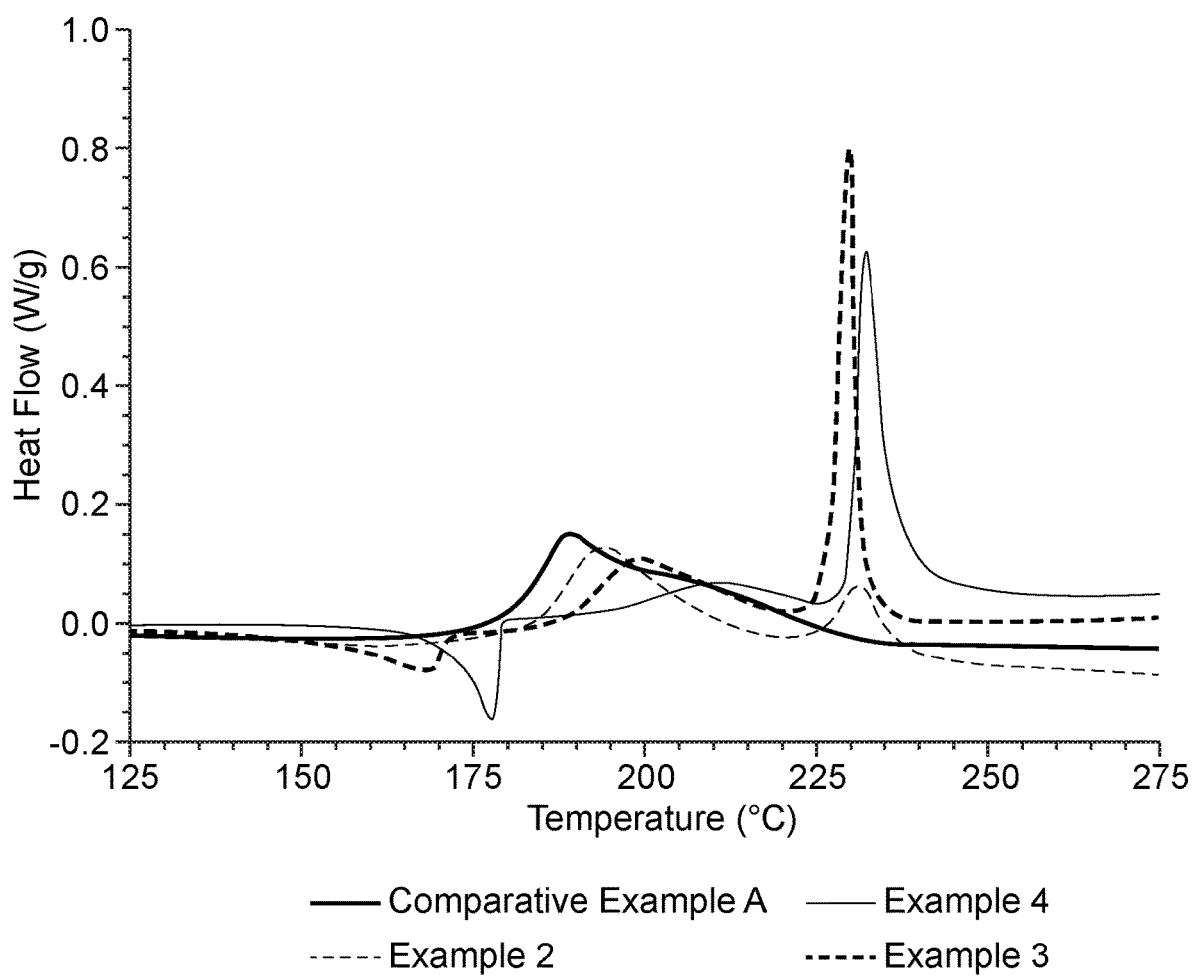

BENZOXAZINE AND PHTHALONITRILE RESIN BLENDS

CROSS REFERENCE To RELATED APPLICATIONS

This application is a national stage filing under 35 U.S.C. 371 of PCT/US2016/064902, filed Dec. 5, 2016, which claims the benefit of U.S. Application No. 62/267727, filed Dec. 15, 2015, the disclosure of which is incorporated by reference in its/their entirety herein.

FIELD

The present disclosure relates to resin blends, including resin blends that improve the processing of phthalonitrile resins.

BACKGROUND

Benzoxazines and compositions containing benzoxazine (BZN) are known (see, for example, U.S. Pat. Nos. 5,543,516 and 6,207,786 to Ishida et al.; S. Rimdusit and H. Ishida, "Development of New Class of Electronic Packaging Materials Based on Ternary Systems of Benzoxazine, Epoxy, and Phenolic Resins", Polymer, 41, 7941-49 (2000); and H. Kimura et al., "New Thermosetting Resin from Bisphenol A-based Benzoxazine and Bisoxazoline", J. App. Polym. Sci., 72, 1551-58 (1999). Benzoxazine resins are a polymer network forming resin that affords good thermal stability and degradation resistance. Benzoxazine cured networks offer good thermal stability on par with high temperature epoxies, phenolics, and bismaleimides. Benefits of benzoxazine resins include, for example, favorable processing properties, long working time, low cure exotherms, low cure shrinkage, and out-of-autoclave processing.

Phthalonitrile (PN) Resins are a class of network forming resins that supply excellent thermal stability and degradation resistance, yet commercialization of phthalonitrile resin technology and use is hindered by poor processing properties, high cost, and high temperature autoclave cures. Phthalonitrile resins have high melt temperatures due to the rigid structure of many phthalonitrile molecules, which incorporate a large percentage of aromatic structures to maintain the thermal performance of the resin and the networked polymer. The phthalonitrile moiety is also rigid and planar and has a tendency to crystallize. These molecular structure attributes contribute to the high melt temperature of multifunctional PN resins. The high cost of the resin is driven by resin synthesis which utilizes higher cost starting materials similar to anhydride and imide resins and multistep synthesis routes.

Some have experimented with the insertion of a benzoxazine chemical moieties into a phthalonitrile functional molecule followed by gelation of the resin (Brunovska, Z. and H. Ishida, "Thermal study on the copolymers of phthalonitrile and phenylnitrile-functional benzoxazines", Journal of Applied Polymer Science, 73(14): p. 2937-2949, (1999); and Xu, M., et al., "Design of low temperature self-cured phthalonitrile-based polymers for advanced glass fiber nanonano laminates", Journal of Materials Science, 48(23): p. 8108-8116, (2013)). A disadvantage of such an approach is the time and cost associated with the chemical synthesis of inserting, for instance, a benzoxazine moiety into a phthalonitrile functional molecule.

SUMMARY

Resin blends are provided that provide a blended network having a combination of advantageous properties from the resins.

The present disclosure is directed to a resin blend comprising a blend of a benzoxazine resin and the phthalonitrile resin. In certain embodiments, the resin blend can further include a catalyst, a curative, a toughener (e.g., toughening agent), a filler, or combinations thereof.

Temperature resistant polymer networks are critical for an increasing number of market applications. As the environmental temperature of an application increases, the number of available materials able to meet requirements shrinks rapidly. The present blends are useful for applications in which a temperature resistant polymer is beneficial.

It was discovered that there remains a need for improving processing of phthalonitrile resins. The present disclosure overcomes difficulties noted for processing phthalonitrile resins, such as high melt temperatures. Blending benzoxazine and phthalonitrile resins and curing achieves a blended networked polymer with high temperature performance in terms of thermal degradation resistance and glass transition temperature. Such networked polymers demonstrate high temperature thermal and oxidative degradation resistance that exceeds the benzoxazine networked polymer and approaches the phthalonitrile networked polymer. The glass transition temperature of such blended networks is typically also non-linearly increased beyond the sum of the constituent networks. Moreover, benzoxazine/phthalonitrile resin blends prior to cure have more favorable processing and curing properties compared to the phthalonitrile resins and can be on par with benzoxazine resins enabling greater ease in article manufacturing.

BRIEF DESCRIPTION OF THE DRAWINGS

FIG. 1 is a DSC scan of Comparative Example A and Examples 2, 3, and 4.

DETAILED DESCRIPTION

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should be understood that, as used herein: The term "a", "an", and "the" are used interchangeably with "at least one" to mean one or more of the elements being described.

The term "and/or" means either or both. For example "A and/or B" means only A, only B, or both A and B.

As used in this specification, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

The terms "comprises" and variations thereof do not have a limiting meaning where these terms appear in the description and claims.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in some embodiments," "in certain embodiments," "in one embodiment," "in many embodiments" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

As used herein, the term "phthalonitrile" is inclusive of compounds and polymers having the characteristic benzene derivative having two adjacent nitrile groups. In the illustrated phthalonitrile group, R is for instance and without limitation, ether, thioether, aryl, alkyl, halogen, amine, (hetero)hydrocarbyl, ester, or amide.

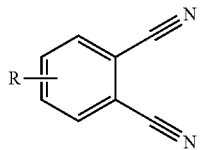

As used herein, the term "benzoxazine" is inclusive of compounds and polymers having the characteristic benzoxazine ring. In the illustrated benzoxazine group, R is the residue of a mono- or poly-aromatic amine, hydrocarbyl amine, or (hetero)hydrocarbyl amine.

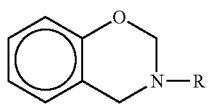

As used herein "polybenzoxazine" refers to a compound having two or more benzoxazine rings.

As used herein "poly(benzoxazine)" refers to the polymer resulting from the polymerization of benzoxazine or polybenzoxazine compounds.

As used herein, "Bronsted acid" refers to any molecular or ionic species that can act as a proton donor.

As used herein, "chalcogenide" refers to a binary compound of a chalcogen with a more electropositive element or radical.

As used herein, "tosylate" refers to toluenesulfonyl compounds.

As used herein, "alkyl" includes straight-chained, branched, and cyclic alkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, and norbornyl, and the like. Unless otherwise noted, alkyl groups may be mono- or polyvalent.

As used herein, the term "heteroalkyl" includes both straight-chained, branched, and cyclic alkyl groups with one or more heteroatoms independently selected from S, O, Si, P, and N, and both unsubstituted and substituted alkyl groups. Unless otherwise indicated, the heteroalkyl groups typically contain from 1 to 20 carbon atoms. "Heteroalkyl" is a subset of "hetero(hetero)hydrocarbyl" described below. Examples of "heteroalkyl" as used herein include, but are not limited to, methoxy, ethoxy, propoxy, 3,6-dioxaheptyl, 3-(trimethylsilyl)-propyl, 4-dimethylaminobutanyl, and the like. Unless otherwise noted, heteroalkyl groups may be mono- or polyvalent.

As used herein, "aryl" is an aromatic group containing 6-18 ring atoms and can contain fused rings, which may be saturated, unsaturated, or aromatic. Examples of an aryl group include phenyl, naphthyl, biphenyl, phenanthryl, and anthracyl. Heteroaryl is aryl containing 1-3 heteroatoms such as nitrogen, oxygen, or sulfur and can contain fused rings. Some examples of heteroaryl are pyridyl, furanyl, pyrrolyl, thienyl, thiazolyl, oxazolyl, imidazolyl, indolyl, benzofuranyl, and benzthiazolyl. Unless otherwise noted, aryl and heteroaryl groups may be mono- or polyvalent.

As used herein, "(hetero)hydrocarbyl" is inclusive of (hetero)hydrocarbyl alkyl and aryl groups, and hetero(hetero)hydrocarbyl heteroalkyl and heteroaryl groups, the later comprising one or more catenary oxygen heteroatoms such as ether or amino groups. Hetero(hetero)hydrocarbyl may optionally contain one or more catenary (in-chain) functional groups including ester, amide, urea, urethane and carbonate functional groups. Unless otherwise indicated, the non-polymeric (hetero)hydrocarbyl groups typically contain from 1 to 60 carbon atoms. Some examples of such (hetero)hydrocarbyls as used herein include, but are not limited to, methoxy, ethoxy, propoxy, 4-diphenylaminobutyl, 2-(2'-phenoxyethoxy)ethyl, 3,6-dioxaheptyl, 3,6-dioxahexyl-6-phenyl, in addition to those described for "alkyl", "heteroalkyl", "aryl" and "heteroaryl" supra.

As used herein, the term "residue" is used to define the (hetero)hydrocarbyl portion of a group remaining after removal (or reaction) of the attached functional groups, or the attached groups in a depicted formula. For example, the "residue" of butyraldehyde, $C_4H_9$—CHO is the monovalent alkyl $C_4H_9$—. The residue of phenylene diamine $H_2N$—$C_6H_4$—$NH_2$, is the divalent aryl —$C_6H_4$—.

Various exemplary embodiments of the disclosure will now be described. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the limitations set forth in the claims and any equivalents thereof.

The present disclosure is directed to a resin blend comprising a blend of a benzoxazine resin and the phthalonitrile resin.

Phthalonitriles undergo an addition cure reaction where four phthalonitrile moieties react to form a phthalocyanine ring. When a multifunctional phthalonitrile resin is employed, the phthalonitrile addition reaction will lead to a phthalocyanine linked network polymer, as shown below in Scheme 1. The phthalocyanine ring is a large, tetra-functional aromatic structure imparting a high crosslink density and rigidity to the cured network. This imparts superior temperature performance to the network and a high glass transition temperature, $T_g$.

formation from phthalonitrile, particularly advantageous for the formation of phthalocyanine based network polymers to avoid unbound reaction byproducts that can weaken the network, leach out of the network, and volatilize at high temperatures. Phthalonitrile cyclotetramerization may be catalyzed by several methods yielding either the metal free ($PcH_2$) or the metal containing (PcM) phthalocyanine. Such reaction schemes are illustrated in Scheme 2 below. $PcH_2$ may be formed from the addition of base, a proton source and heat or the addition of a suitable reducing agent and heat. These conditions may be satisfied through the addition of ammonia, primary amines, secondary and tertiary amines with an active proton source (e.g. alcohol). A suitable Scheme 1. Diphyhalonitrile addition reaction to form a metal free phthalocyanine linked network.

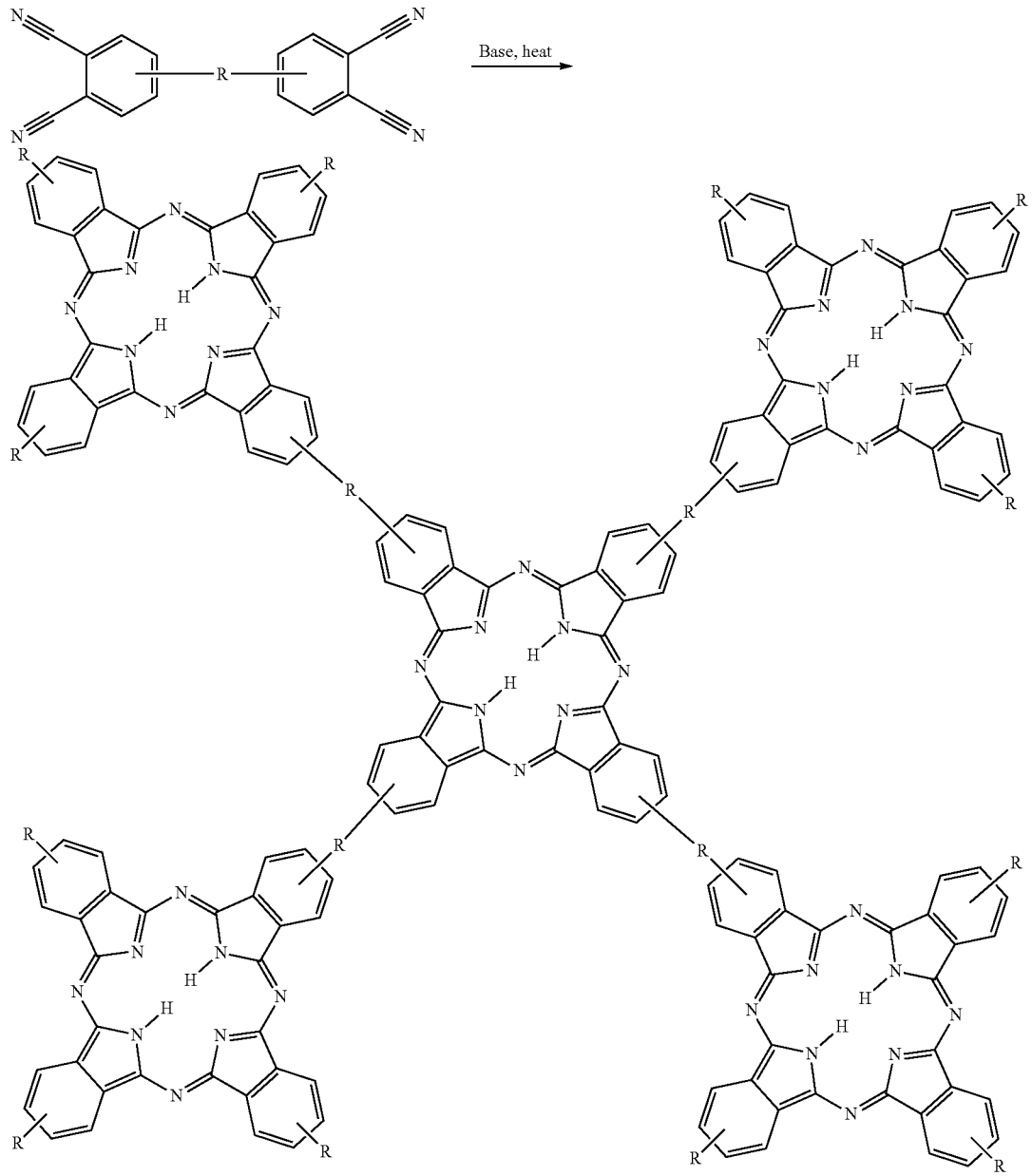

Phthalonitriles are useful precursor resins for bulk reactions due to the addition nature of the phthalocyanine ring reducing agent (e.g. hydroquinone or 1,2,3,6-tetrahydropyridine) able to supply the two electrons and two protons formally needed for PcH$_2$ formation will also lead to cyclotetramerization. PcM may be formed by the addition of metal, organometals or metal salts and heat. The metals coordinate with the central four nitrogen of the phthalocyanine ring. Depending on the coordination state, a metal may interact with more than one phthalocyanine ring giving rise to stacked phthalocyanine structures. Many metals have been shown to result in cyclotetramerization.

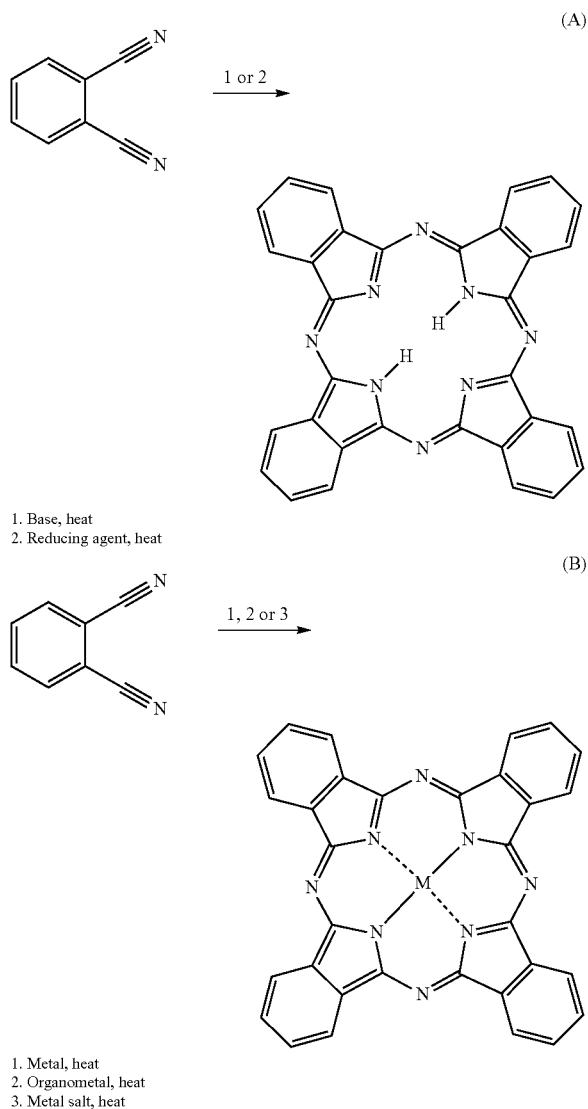

Scheme 2. Phthalonitrile cyclotetramerization to (A) metal free and (B) metal containing phthalocyanine.

1. Base, heat
2. Reducing agent, heat

1. Metal, heat
2. Organometal, heat
3. Metal salt, heat

The formulation of polymer blends is an attempt to marry advantageous properties of two or more polymeric materials and minimize their deficiencies. While simple in thought, successful compatibilization of resins able to achieve miscibility and selectively combine advantageous properties while minimizing deficiencies is not straightforward. An undesirable property in one material component often remains or minimizes the desirable property in another material component. If blends are not compatible (e.g. immiscible blends leading to phase separation, separate unique network formation resulting in no network integration), material deficiencies may instead be exacerbated.

The benzoxazine/phthalonitrile (BZN/PN) blends of the present disclosure involve the direct blending of any number of benzoxazine and phthalonitrile monofunctional and/or multifunctional resins, and then is typically followed by curing to produce a networked polymer. The reaction of the resin blends is thermally initiated and can include a catalyst to speed network formation if desired. The BZN/PN blends demonstrate advantageous properties such as one or more of enhanced thermal stability, elevated glass transition temperature, and processing and cure properties that are better than homopolymer networks formed by the curing of benzoxazine resin(s) and phthalonitrile resin(s) alone. Such advantageous properties are a fortuitous result of these blends, which offer an ability to impart the favorable features of the individual resins and cured homopolymer networks to the blend resin and network with minimal impartation of less desirable properties. The direct blending of benzoxazine and phthalonitrile resins is advantageously simpler, more direct, and less costly than previous approaches to combine benzoxazine and phthalonitrile networks using, for instance, modification of at least one of the resins with a functional group of the other resin (e.g., insertion of a benzoxazine chemical moiety into a phthalonitrile functional molecule).

The inclusion of at least some phthalonitrile resin in a cured blend network has been found to non-linearly impact the glass transition temperature, $T_g$, of the network beyond the sum of the constituent resins. This is an example of the surprising properties of such disclosed benzoxazine/phthalonitrile blends. For instance, the $T_g$ can be raised by 100° C. or more above the benzoxazine homopolymer network depending on the benzoxazine and phthalonitrile resins incorporated into the blend, with only 25 wt % of phthalonitrile resin in the initial resin blend. The $T_g$ has been found to rise rapidly at low phthalonitrile resin in the resin system up to 25 wt % phthalonitrile. At intermediate levels of phthalonitrile resin, approximately 25 wt % to 75 wt %, an increasing concentration of phthalonitrile resin may have less of a pronounced effect on $T_g$ (e.g., the rise in $T_g$ can be more gradual). Lower molecular weight difunctional phthalonitrile resins typically raise the $T_g$ of the blend network more than higher molecular weight difunctional phthalonitrile resins, potentially due to a higher crosslink density and a greater number density of potential phthalocyanine rings. At high levels of phthalonitrile resin, approximately 75 wt % and above, a new regime can be entered where the $T_g$ mimics the properties of the phthalonitrile. For instance, the PdBZN25/RDPN75 blend network was found to not exhibit a $T_g$ transition up to 450° C. when thermal degradation begins to take effect, similar to some phthalonitrile cured homopolymer networks. The $T_g$ in such a regime may be higher than the $T_g$ of resin blends with intermediate levels of phthalonitrile resin to benzoxazine resin, or the $T_g$ may be lower than the $T_g$ of the resin blend with intermediate levels of phthalonitrile to benzoxazine resin. This result suggests that the network structure of the resin blend with intermediate levels of phthalonitrile resin is distinguishable from a traditional benzoxazine network and a phthalonitrile network.

The enhanced thermal stability of the BZN/PN blends was demonstrated by thermal and oxidative degradation resistance exceeding that of the benzoxazine cured homopolymer network and approaching the phthalonitrile cured homopolymer network at high levels of PN resin in the resin blend. The higher degradation resistance affords the blends utility in high temperature applications that require greater thermal stability and degradation resistance than benzoxazine cured networks, yet the drawbacks of using a phthalonitrile resin (e.g. high resin melt temperature, resin cost, network formation cure temperature) hinder its use.

The association between a traditional benzoxazine cured network and a phthalonitrile cured network in the blend network leading to the enhanced thermal properties is not directly known. A potential explanation is thought to be due to the formation of an N-substituted-3-iminoisoindolenine from the combination of a primary amine (which results from the benzoxazine ring opening reaction) and a phthalonitrile moiety. Phenols from the benzoxazine formed network may also react with phthalonitrile to form alkoxy-3-iminoisoindolenine. Additional phthalonitrile may add to the iminoisoindolenine to form polymeric 3-iminoisoindolenine chains that are linked by the benzoxazine formed network and the R linkage between phthalonitrile moieties in the phthalonitrile resin when a multifunctional phthalonitrile resin is employed. Depending on the concentration of amines, phenols, and phthalonitrile, and the segment mobility in the forming network, polymeric 3-iminoisoindolenine may cyclize into tetramers of the phthalocyanine structure, which may exist in different substituted forms. There is also opportunity for the formation of a linkage between the benzoxazine and phthalonitrile resins during the benzoxazine ring opening network formation reaction.

Additional useful features of BZN/PN blends according to at least some embodiments of the present disclosure include low cure exotherms, inherent stability at ambient conditions imparting long shelf life, frustration of phthalonitrile crystallization in BZN/PN miscible blends, and long working times. These features are discussed below in greater detail.

The inclusion of a BZN resin appears to lead to cured networks in shorter cure cycle times than PN homopolymer networks that tend to require high temperatures and long cure times. Such long cure cycle times and required high temperature post cures have hindered phthalonitrile resin from achieving greater commercial use.

Due to the two stage cure of the BZN/PN blends, cure exotherms tend to be kept low, a desirable attribute when curing large mass samples for preventing a thermal runaway. The cure exotherms are offset by the mass of the two blend resins which cure initiate at well separated temperatures. This affords the ability to systematically study the two cure mechanisms and offers an experimental means to test and develop better blends.

The resin blends are inherently stable at ambient conditions. Benzoxazine resins in the absence of a cure catalyst have a long shelf life and only undergo slow thermal cure initiation at temperatures greater than 120° C. Phthalonitrile resins are also stable at ambient conditions and inherently non-reactive in the absence of a catalyst even at elevated temperature. Thermal initiation of phthalonitrile resins requires temperatures in excess of 250° C. for an extended period of time, and conversion of phthalonitrile is low. The inherent non-reactivity of the resins affords a long shelf life to the resin blends.

The ring opening and network formation reactions of benzoxazines leads to the formation of a primary amine, which has recently been shown by the work of Gordisher and Webb (Gorodisher, I. and R. Webb, "Structural and mechanistic insight into polybenzoxazines via NMR", 2013: American Chemical Society; and Webb, R. and I. Gorodisher, "NMR of benzoxazine oligomers and polymers", 2013: American Chemical Society). The formation of the benzoxazine polymer network was reported to be a two-step process, comprising a ring-opening reaction and subsequent rearrangement of the secondary or tertiary benzylamine formed during ring opening. If the amine component of the starting benzoxazine monomer is aromatic, the ultimate poly(benzoxazine) structure is a network of phenols and aromatic amines linked by methylene equivalents similar in topology to well-known phenol-formaldehyde polymers. The network formation reaction is thermally activated and may be catalytically activated at lower temperatures by the addition of a catalyst. Example catalysts include but are not limited to amines, thiols, elemental sulfur, and metal salts. This polymerization mechanism leaves phenol and primary amine functionality along the polymer backbone.

In a BZN/PN blend, the catalytic activity of the tertiary amine of the benzoxazine to initiate cure of the phthalonitrile in the absence of a proton donor is minimal. Until the formation of a primary amine and alcohol via ring opening of the benzoxazine, the phthalonitrile resin component is non-reactive toward phthalocyanine formation. After ring opening of the benzoxazine, however, phthalonitrile tetramerization proceeds at a reasonable rate at temperatures above the benzoxazine ring opening exotherm.

The high melt temperature of phthalonitriles complicates processing of phthalonitrile resins. Phthalonitrile melt temperatures of most resins are near or exceed the phthalocyanine formation reaction, which limits the working time of the resin prior to gelation. Advantageously, the addition of benzoxazine resin tends to limit phthalonitrile crystallization in BZN/PN miscible blends, thereby promoting liquid processing of the blended resin. Referring to FIG. 1, the crystallization of the phthalonitrile resin is shown to be reduced and eliminated as the mass fraction of benzoxazine resin is increased.

The softening temperature of many benzoxazine and phthalonitrile resins, and consequently the resin blends, falls between 40-60° C. This creates a large temperature differential (>100° C.) between the resin softening temperature and the benzoxazine cure exotherm, which proceeds at a reasonable rate at temperatures greater than 170° C. when initiated thermally in the absence of a catalyst. The large temperature differential provides a large processing window to the BZN/PN blends. Since phthalonitrile tetramerization is linked to benzoxazine ring opening, the long working time of benzoxazine resins is imparted to the resin blends.

Surprisingly, advantageous effects of BZN/PN blends have been found even at small amounts of one resin blended with a large amount of the other. For instance, in some embodiments the resin blend includes a weight ratio of the phthalonitrile resin to benzoxazine resin ranging from 2:98 to 99:1, inclusive; from 5:95 to 96:4, inclusive; from 15:85 to 85:15, inclusive; or from 75:25 to 25:75, inclusive. As little as about 1 wt % benzoxazine resin blended with phthalonitrile resin can provide at least some of the above described improvements to processing properties of the phthalonitrile, as compared with phthalonitrile homopolymer. Similarly, as little as about 2 wt % phthalonitrile resin blended with benzoxazine resin can provide at least some of the above described beneficial characteristics of phthalonitrile resin to the benzoxazine resin, as compared with benzoxazine homopolymer.

In certain embodiments, the benzoxazine resin is of Formula I:

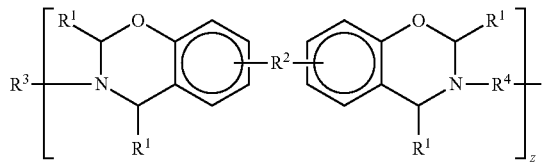

wherein
each $R^1$ is H or an alkyl group, and is the residue of an aliphatic aldehyde,
$R^2$ is a covalent bond, or a polyvalent (hetero)hydrocarbyl group, preferably a covalent bond or a divalent alkyl group;
$R^3$ and $R^4$ are independently selected from the (hetero)hydrocarbyl residues of a primary amino compound; and
z is at least 1;
with the proviso that neither $R^3$ nor $R^4$ is of Formula III:

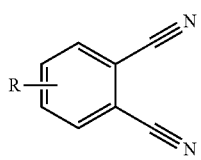

where R is selected from a covalent bond, a C4-C20 alkyl chain, —NH, a phenol, biphenol, bisphenol, a polyvalent phenol, an imide, an ether, a thioether, amide, ester, or a polyvalent (hetero)hydrocarbyl residue.

In certain embodiments, the benzoxazine resin is of Formula II:

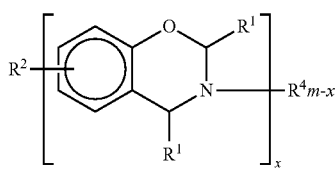

wherein
each $R^1$ is H or an alkyl group, and is the residue of an aliphatic aldehyde,
$R^2$ is H, a covalent bond, a phenol or a polyvalent (hetero)hydrocarbyl group, preferably H, a covalent bond or a divalent alkyl group;
$R^4$ is a (hetero)hydrocarbyl residue of a primary amino compound, $R^4(NH_2)_m$, with the proviso that $R^4$ is not of Formula III:

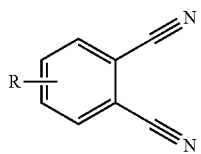

where R is selected from a covalent bond, a C4-C20 alkyl chain, —NH, a phenol, biphenol, bisphenol, a polyvalent phenol, an imide, an ether, a thioether, amide, ester, a polyvalent (hetero)hydrocarbyl residue;
where when $R^4$ is an aryl group, m is 1-4; and x is at least 1.

In certain embodiments, the benzoxazine resin of Formula I is a subset of the benzoxazine resin of Formula II.

In some embodiments, the benzoxazine resin comprises a monofunctional benzoxazine, whereas in other embodiments the benzoxazine resin comprises a multifunctional benzoxazine. For example, the benzoxazine resin can be derived from bisphenol A and aniline, or from bisphenol F and aniline, or from phenol and methylene dianiline, or from phenol and aniline.

In many embodiments, the phthalonitrile resin is of Formula IV:

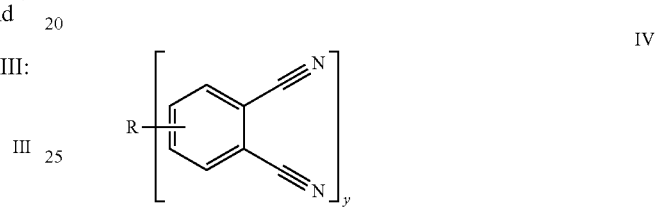

where R is selected from H, a covalent bond, —$C(CH_3)_3$, a C4-C20 alkyl chain, —$NO_2$, —$NH_2$, a phenol, biphenol, bisphenol, a polyvalent phenol, an imide, an ether, a thioether, amide, ester, or a polyvalent (hetero)hydrocarbyl residue; and y is at least 1;
with the proviso that R is not of Formula V or Formula VI:

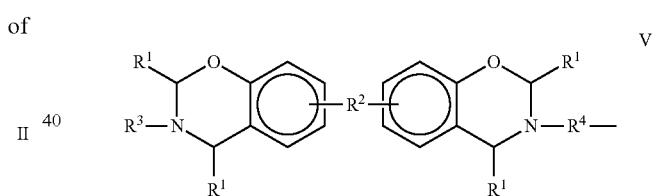

wherein
each $R^1$ is H or an alkyl group, and is the residue of an aliphatic aldehyde,
$R^2$ is a covalent bond, or a polyvalent (hetero)hydrocarbyl group, preferably a covalent bond or a divalent alkyl group;
$R^3$ and $R^4$ are independently selected from the (hetero)hydrocarbyl residues of a primary amino compound; and

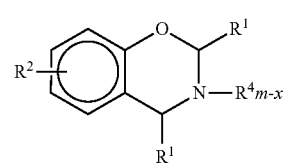

wherein
each $R^1$ is H or an alkyl group, and is the residue of an aliphatic aldehyde,
$R^2$ is H, a covalent bond, a phenol or a polyvalent (hetero)hydrocarbyl group, preferably H, a covalent bond or a divalent alkyl group;

$R^4$ is a (hetero)hydrocarbyl residue of a primary amino compound, $R^4(NH_2)_m$, where when $R^4$ is an aryl group, m is 1-4; and x is at least 1.

In some embodiments, the phthalonitrile resin comprises a monofunctional phthalonitrile, whereas in other embodiments the phthalonitrile resin comprises a multifunctional phthalonitrile. For example, the phthalonitrile resin can be derived from resorcinol and 4-nitrophthalonitrile, or from bisphenol M and 4-nitrophthalonitrile, or from bisphenol T and 4-nitrophthalonitrile, or from other multifunctional phenols (e.g. biphenol, bisphenol A, bisphenol E, bisphenol F, bisphenol P, bisphenol S, and bisphenol FL) and 4-nitrophthalonitrile. In other embodiments, the phthalonitrile resin can be derived from a multifunctional phenol and 3-nitrophthalonitrile; a multifunctional thiol and 3- or 4-nitrophthalonitrile as disclosed in U.S. Pat. No. 5,350,828 (Keller); or a multifunctional anhydride and 3- or 4-aminophthalonitrile as disclosed in U.S. Pat. No. 5,262,514 (Keller). In certain embodiments, the phthalonitrile resin comprises an alkyl-functionalized 1,2-dicyanobenzene.

Typically, for compatibility with the benzoxazine resin, the phthalonitrile resin has a melting temperature of 220° C. or less, or 210° C. or less, or 200° C. or less, or 180° C. or less, or 150° C. or less, or 125° C. or less, or 100° C. or less.

In certain embodiments, the resin blend is a solid at 25° C., whereas in other embodiments the resin blend is a fluid at 25° C.

In addition, resin blends may include more than one benzoxazine resin, more than one phthalonitrile resin, or both. For example, in certain embodiments, the resin blend further comprises a second benzoxazine resin, a third benzoxazine resin, a fourth benzoxazine resin, and so on. Similarly, in certain embodiments, the resin blend further comprises a second phthalonitrile resin, a third phthalonitrile resin, a fourth phthalonitrile, resin, and so on.

Benzoxazines may be prepared by combining a phenolic compound, and aliphatic aldehyde, and a primary aromatic amine compound, such as aniline. U.S. Pat. No. 5,543,516 (Ishida) and U.S. Pat. No. 7,041,772 (Aizawa et al.), for instance, describe methods of forming benzoxazines. Other suitable reaction schemes to produce mono-, di- and higher-functional benzoxazines are described in N. N. Ghosh et al., "Polybenzoxazine-new high performance thermosetting resins: synthesis and properties", *Prog. Polym. Sci.* 32 (2007), pp. 1344-1391.

One suitable method of producing benzoxazine resins is illustrated by the following reaction Scheme 3:

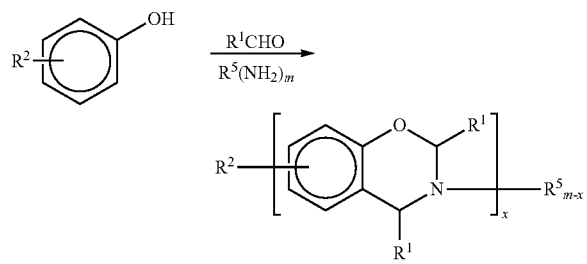

wherein
each $R^1$ is H or an alkyl group, and is the residue of an aliphatic aldehyde;
$R^2$ is H, a covalent bond, a phenol or a polyvalent (hetero)hydrocarbyl group, preferably H, a covalent bond or a divalent alkyl group;

$R^5$ is aryl residue of a primary amino compound, $R^5(NH_2)_m$, where $R^5$ is an aryl group, m is 1-4; and x is at least 1. It will be appreciated that as the $R^2$ group may be part of a polyphenolic compound, said $R^2$ group may bond to another benzoxazine ring. Similarly, as the $R^5$ may be derived from a polyamine, the $R^5$ may also be bonded to another benzoxazine ring.

In the preparation of a benzoxazine resin, mono- or polyphenolic compounds may be used. The phenolic compound may be further substituted without limitation if desired. For example, the 3, 4, and 5 positions of the phenolic compound may be hydrogen or substituted with other suitable substituents such as alkyl, cycloalkyl, heterocycloalkyl, aryl, heteroaryl, aralkyl, heteroaralkyl, alkoxy, alkoxyalkylene, hydroxylalkyl, hydroxyl, haloalkyl, carboxyl, halo, amino, aminoalkyl, alkylcarbonyloxy, alkyloxycarbonyl, alkylcarbonyl, alkylcarbonylamino, aminocarbonyl, alkylsulfonylamino, aminosulfonyl, sulfonic acid, or alkylsulfonyl. Desirably at least one of the positions ortho to the hydroxyl group is unsubstituted to facilitate benzoxazine ring formation.

The aryl ring of the phenolic compound may be a phenyl ring as depicted, or may be selected from naphthyl, biphenyl, phenanthryl, and anthracyl. The aryl ring of the phenolic compound may further comprise a heteroaryl ring containing 1-3 heteroatoms such as nitrogen, oxygen, or sulfur and can contain fused rings. Some examples of heteroaryl are pyridyl, furanyl, pyrrolyl, thienyl, thiazolyl, oxazolyl, imidazolyl, indolyl, benzofuranyl, and benzthiazolyl.

Examples or mono-functional phenols include phenol; cresol; 2-bromo-4-methylphenol; 2-allyphenol; 4-aminophenol; and the like. Examples of difunctional phenols (polyphenolic compounds) include phenolphthalein; biphenol; 4-4'-methylene-di-phenol; 4-4'-dihydroxybenzophenone; bisphenol-A; 1,8-dihydroxyanthraquinone; 1,6-dihydroxnaphthalene; 2,2'-dihydroxyazobenzene; resorcinol; fluorene bisphenol; and the like. Examples of trifunctional phenols comprise 1,3,5-trihydroxy benzene and the like.

The aldehyde reactants used in preparing benzoxazine resins include formaldehyde; paraformaldehyde; polyoxymethylene; as well as aldehydes having the general formula $R^1CHO$, where $R^1$ is H or an alkyl group, including mixtures of such aldehydes, desirably having from 1 to 12 carbon atoms. The $R^1$ group may be linear or branched, cyclic or acyclic, saturated or unsaturated, or combinations thereof. Other useful aldehydes include crotonaldehyde; acetaldehyde; propionaldehyde; butyraldehyde; and heptaldehyde.

Amino compounds useful in preparing benzoxazine resins can be substituted or unsubstituted aromatic amines having at least one primary amine group. The amines may be aliphatic or aromatic amines. It can be substituted, for example, with groups such as alkyl, cycloalkyl, heterocycloalkyl, aryl, heteroaryl, aralkyl, or heteroaralkyl.

Amines useful in the preparation of benzoxazine resins include those of the formula $R^5(NH_2)_m$ include aryl monoamines and polyamines. $R^5$ is an aryl group that has a valence of m, and is the residue of a mono-, di- or higher aromatic amine having at least one primary amine group. Subscript m is 1 to 4.

Examples of useful aromatic amines include aniline, o-, m- or p-toluidine, 2,6-dimethyl aniline, 2,5-dimethyl aniline p-bromoaniline, 3,5-dimethyl aniline and 2,4-dimethyl aniline, p-nitroaniline, di-(4-aminophenyl)sulfone, di-(4-aminophenyl)ether, 2, 2-bis(4-aminophenyl)propane, 4,4'-diamino diphenylmethane, 3,3'-dimethyl(4,4'-diaminodiphenyl methane, m- or p-phenylene diamine, m-xylylene diamine, toluene diamine, 4,4'methylene dianiline benzidine, 4,4'-thiodianiline, 4-methoxy-1,3-phenyl-diamine, 2,6-diaminopyridine, and dianisidine.

It will be understood that monoamines will cyclize with the aldehyde and phenolic compound to produce mono-benzoxazine compounds, while di- or higher amines will cyclize to produce di- and poly-benzoxazine compounds: For example, a diamine (m=2 in the Scheme 4 below) will produce a di-benzoxazine, as shown in Scheme 4:

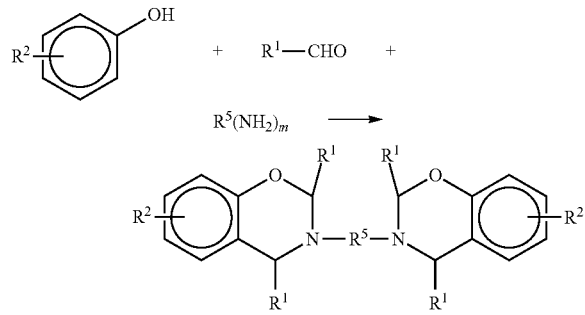

wherein each $R^1$ is H or an alkyl group, and is the residue of an aliphatic aldehyde;
$R^2$ is H, a covalent bond, or a polyvalent (hetero)hydrocarbyl group, preferably H, a covalent bond or a divalent alkyl group;
$R^5$ is the aryl residue of a primary amino compound.

Further, polymeric benzoxazines may be prepared from a polyphenolic compounds, such as bisphenol-A, and a di- or polyamine, which may be further ring-opening polymerized as shown in Formula I:

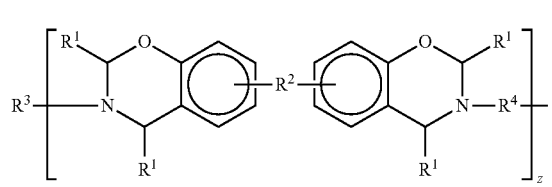

wherein
each $R^1$ is H or an alkyl group, and is the residue of an aliphatic aldehyde,
$R^2$ is a covalent bond, or a polyvalent (hetero)hydrocarbyl group, preferably a covalent bond or a divalent alkyl group;
$R^3$ and $R^4$ are independently selected from the (hetero)hydrocarbyl residues of a primary amino compound;
z is at least 1, preferably 2 or greater.

In certain embodiments, the resin blend further comprises at least one additive. Suitable additives include for instance and without limitation, additives selected from a catalyst, a curative, a toughener, a filler, and one or more combinations thereof.

In some embodiments the resin blend comprises a catalyst. The catalyst can comprise a tosylate, a chalcogenide element or compound, a Bronsted acid, a metal, or a metal salt.

Tosylates are toluenesulfonyl compounds, such as esters of p-toluenesulfonic acid. Suitable tosylates include the tosylates described in co-owned PCT Application Publication No. WO 2014/179100 (Gorodisher et al.).

A Bronsted acid is any molecular or ionic species that can act as a proton donor. Suitable examples of Bronsted acids include for instance and without limitation, mineral acids (e.g., sulfuric acid, hydrochloric acid, nitric acid, phosphoric acid, hydrobromic acid, and partially neutralized salts thereof), organic acids (e.g., formic acid, acetic acid, trifluoroacetic acid, trichloroacetic acid, toluenesulfonic acid, dichloroacetic acid, phenylphosphonic acid, ethylphosphinic acid, methanesulfonic acid, ethanesulfonic acid, 2-propanesulfonic acid, trifluoromethanesulfonic acid, benzenesulfonic acid, and para-toluenesulfonic acid), and combinations thereof.

Chalcogenide elements include oxygen (O), sulfur (S), selenium (Se), tellurium (Te), and polonium (Po). Suitable catalysts include those selected from the group of elemental sulfur, elemental selenium, a sulfide of a Group VA element (e.g., N, P, As, Sb, Bi) of the Periodic Table (referring to the older CAS or American group numbering system), a sulfide of a Group VIA element (e.g., O, S, Se, Te, Po), a selenide of a Group VA element, a selenide of a Group VIA element, and a combination thereof. Crystalline or amorphous forms of elemental sulfur may be used as a catalyst. Elemental sulfur is nominally described as a Ss ring, although other polymers and oligomers are known. Various allotropic forms of elemental selenium may be used. Nominally, selenium sulfide refers to many different compounds of sulfur and selenium, but is generally given by the formula $SeS_2$. Phosphorus sesquisulfide, phosphorus pentasulfide, and tetrasulfur tetranitride can be used.

Suitable metals include gold, silver, palladium, platinum, rhodium, ruthenium, osmium, copper, iridium, and the like, and combinations thereof. Suitable metal salts include soluble salts of aluminum, iron, zirconium, chromium, cobalt, titanium, magnesium, zinc, calcium, copper, manganese, strontium, yttrium, lanthanum, polyaluminum halide, basic aluminum nitrate, hydrolyzed aluminum, aluminum sulfate, zirconyl salts, titanyl salts, and combinations thereof.

Typically, a catalyst is present in an amount of between 0 and 40 percent by weight of the resin blend. In certain embodiments, the melting point of the added catalyst is lower than the thermal self-catalysis temperature of the benzoxazine included in the resin blend.

Resin blends of the disclosure optionally include one or more curatives. Such curatives are selected from the group of a thiol compound, an amine compound, and a combination thereof. In certain embodiments, at least one of the thiol compound and the amine compound is polyfunctional. In certain embodiments, the curative comprises N-cyanoguanidine. Such curatives can function as reactive diluents.

Useful such compounds have at least one nucleophilic functional group that ring-opens the benzoxazine. Such compounds are of the general formula:

$$R^6-(ZH)_p \qquad (VII)$$

wherein, in Formula (VII):
$R^6$ is a (hetero)hydrocarbyl group;
each Z is independently —S— or —$NR^7$, where $R^7$ is H or a hydrocarbyl group, including aryl and alkyl; and
p is 1 to 6 (in certain embodiments, p is at least 2).

The benzoxazine ring may also be opened with thiols of the formula:

$$R^6-(SH)_p \qquad (VIII)$$

wherein, in Formula (VIII), $R^6$ and p are as defined above for Formula (VII). That is, in the compounds of Formula (VIII), p is 1 to 6, or 2 to 6, and $R^6$ includes a (hetero)hydrocarbyl group, including aliphatic and aromatic monothiols and polythiols. $R^6$ may optionally further include one or more functional groups including hydroxyl, acid, ester, cyano, urea, urethane and ether groups.

In some preferred embodiments, the thiol compounds of Formula (VIII) are of the formula:

$$R^8-[(CO_2)_x-R^9-SH]_y \qquad (IX)$$

wherein in Formula (IX):

$R^8$ is an alkylene group, an aryl group, an oxyalkylene group, or combination thereof; $R^9$ is a divalent hydrocarbyl group;

x is 0 or 1; and y is 1 to 6, preferably 2 to 6.

In certain embodiments, the compounds of Formula (IX) are those in which $R^8$ is an alkylene group.

Useful alkyl thiols include methyl, ethyl and butyl thiol. Other useful thiols include 2-mercaptoethanol, 3-mercapto-1,2-propanediol, 4-mercaptobutanol, mercaptoundecanol, 2-mercaptoethylamine, 2,3-dimercaptopropanol, 3-mercaptopropyltrimethoxysilane, mercaptoalkanoic acids and esters thereof including mercaptoproionic acid, 2-chloroethanethiol, 2-amino-3-mercaptopropionic acid, dodecyl mercaptan, thiophenol, 2-mercaptoethyl ether, and pentaerythritol tetrathioglycolate. Specific examples of useful polythiols include dimercaptodiethyl sulfide; 1,6-hexanedithiol; 1,8-dimercapto-3,6-dithiaoctane; propane-1,2,3-trithiol; 1,2-bis[(2-mercaptoethyl)thio]-3-mercaptopropane; tetrakis(7-mercapto-2,5-dithiaheptyl)methane; and trithiocyanuric acid.

Another useful class of polythiols includes those obtained by esterification of a polyol with a terminally thiol-substituted carboxylic acid (or derivative thereof such as esters or acyl halides) including α- or β-mercaptocarboxylic acids such as thioglycolic acid or β-mercaptopropionic acid or esters thereof. Useful examples of compounds thus obtained include ethylene glycol bis(thioglycolate), pentaerythritol tetrakis(3-mercaptopropionate), ethylene glycol bis(3-mercaptopropionate), trimethylolpropane tris(thioglycolate), trimethylolpropane tris(β-mercaptopropionate), pentaerythritol tetrakis(thioglycolate) pentaerythritol tetrakis(β-mercaptopropionate), all of which are commercially available. A specific example of a polymeric polythiol is polypropylene ether glycol bis(3-mercaptopropionate) which is prepared from polypropylene-ether glycol (e.g., that available under the trade name PLURAXOL P201 from BASF Wyandotte Chemical Corp.) and 3-mercaptopropionic acid by esterification.

In some embodiments, useful thiols include those thiols derived from epoxy compounds. The polythiol may be derived from the reaction between $H_2S$ (or equivalent) and an epoxy resin having two or more functional groups and preferably having a molecular weight of less than 1000. For example, bifunctional epoxy resins, such as a bisphenol A epoxy resin and a bisphenol F epoxy resin, and novolak epoxy resins, such as a phenolic novolak epoxy resin and a cresol novolak epoxy resin, or amine epoxy resins, can be used. In addition, generally known polyfunctional epoxy resins, heterocycle-containing epoxy resins, and alicyclic epoxy resins can be used. These epoxy resins may be used alone or in combinations of two or more chemical types or molecular weight ranges.

A particularly useful polythiol is that derived from bisphenol-A diglycidyl ether, available as QX-11 from Japan Epoxy Resins, having a thiol equivalent weight of approximately 245 and the following general structure, where n is at least 1:

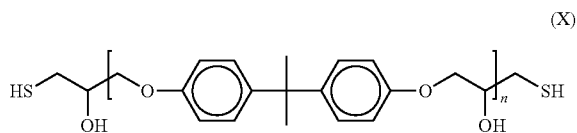

(X)

Useful soluble, high molecular weight thiols include polyethylene glycol di(2-mercaptoacetate), and those resins available under the trade names LP-3 (supplied by LP North America, Houston, Tex.) and PERMAPOL P3 (supplied by Products Research & Chemical Corp., Glendale, Calif.), and compounds such as the adduct of 2-mercaptoethylamine and caprolactam.

Combinations of various curatives can be used if desired. The curative is typically present in an amount of between 0 and 40 percent by weight of the resin blend.

Certain other optional additives may also be included, including, for example, tougheners, fillers, and combinations thereof. Such additives provide various functions. For instance, a toughening agent such as organic particles, may add strength to the composition after curing without interfering with curing. It will be understood by one of skill in the art that one compound may form two or more different functions. For example, a compound may function as both a toughening agent and a filler.

In some embodiments, such additives will not react with the resins of the resin blend. In some embodiments, such additives may include reactive functional groups, particularly as end groups.

Examples of such reactive functional groups include, but are not limited to, amines, thiols, alcohols, epoxides, vinyls, and combinations thereof.

Toughening agents are useful in resin blends of the present disclosure are polymeric compounds having both a rubbery phase and a thermoplastic phase such as: graft polymers having a polymerized, diene, rubbery core and a polyacrylate, polymethacrylate shell; graft polymers having a rubbery, polyacrylate core with a polyacrylate or polymethacrylate shell; and elastomeric particles polymerized in situ in the epoxide from free radical polymerizable monomers and a copolymerizable polymeric stabilizer.

Examples of useful toughening agents of the first type include graft copolymers having a polymerized, diene, rubbery backbone or core to which is grafted a shell of an acrylic acid ester or methacrylic acid ester, monovinyl aromatic hydrocarbon, or a mixture thereof, such as disclosed in U.S. Pat. No. 3,496,250 (Czerwinski). Exemplary rubbery backbones include polymerized butadiene or a polymerized mixture of butadiene and styrene. Exemplary shells including polymerized methacrylic acid esters are lower alkyl (C1-C4)substituted methacrylates. Exemplary monovinyl aromatic hydrocarbons are styrene, alpha-methylstyrene, vinyltoluene, vinylxylene, ethylvinylbenzene, isopropylstyrene, chlorostyrene, dichlorostyrene, and ethylchlorostyrene. It is important that the graft copolymer contain no functional groups that would poison the catalyst.

Examples of useful toughening agents of the second type are acrylate core-shell graft copolymers wherein the core or backbone is a polyacrylate polymer having a glass transition temperature below 0° C., such as polybutyl acrylate or polyisooctyl acrylate to which is grafted a polymethacrylate polymer (shell) having a glass transition above 25° C., such as polymethylmethacrylate.

The third class of toughening agents useful in the invention includes elastomeric particles that have a glass transition temperature ($T_g$) below 25° C. before mixing with the other components of the composition. These elastomeric particles are polymerized from free radical polymerizable monomers and a copolymerizable polymeric stabilizer that is soluble in the benzoxazine. The free radical polymerizable monomers are ethylenically unsaturated monomers or diisocyanates combined with co-reactive difunctional hydrogen compounds such as diols, diamines, and alkanolamines.

Useful toughening agents include core/shell polymers, such as methacrylate-butadiene-styrene (MBS) copolymer wherein the core is crosslinked styrene/butadiene rubber and the shell is polymethylacrylate (for example, those available under the trade names ACRYLOID KM653 and KM680, from Rohm and Haas, Philadelphia, Pa.), those having a core including polybutadiene and a shell including poly(methyl methacrylate) (for example, those available under the trade names KANE ACE M511, M521, B11A, B22, B31, and M901 from Kaneka Corporation, Houston, Tex. and CLEARSTRENGTH C223 from ATOFINA, Philadelphia, Pa.), those having a polysiloxane core and a polyacrylate shell (for example, those available under the trade names CLEARSTRENGTH S-2001 from ATOFINA and GENIOPERL P22 from Wacker-Chemie GmbH, Wacker Silicones, Munich, Germany), those having a polyacrylate core and a poly(methyl methacrylate) shell (for example, those available under the trade names PARALOID EXL2330 from Rohm and Haas and STAPHYLOID AC3355 and AC3395 from Takeda Chemical Company, Osaka, Japan), those having an MBS core and a poly(methyl methacrylate) shell (for example, those available under the trade names PARALOID EXL2691A, EXL2691, and EXL2655 from Rohm and Haas); and the like; and mixtures thereof.

As used above, for acrylic core/shell materials "core" will be understood to be an acrylic polymer having a $T_g$ of less than 0° C. and "shell" will be understood to be an acrylic polymer having a $T_g$ of greater than 25° C.

Other useful toughening agents include: carboxylated and amine terminated acrylonitrile/butadiene vulcanizable elastomer precursors, such as those available under the trade names HYCAR CTBN 1300X8, ATBN 1300X16, and HYCAR 1072 from B. F. Goodrich Chemical Co.; butadiene polymers, such as those available under the trade name HYCAR CTB; amine functional polyethers such as HCl 101 (i.e., polytetramethylene oxide diamine) a 10,000 MW, primary amine-terminated, compound from 3M Co., St. Paul, Minn., and those available under the trade name JEFFAMINE from Huntsman Chemical Co., Houston, Tex. Useful liquid polybutadiene hydroxyl terminated resins include those available under the trade names LIQUIFLEX H by Petroflex of Wilmington, Del., and HT 45 by Sartomer of Exton, Pa.

Tougheners may include epoxy-terminated compounds, which can be incorporated into the polymer backbone. A typical, preferred, list of tougheners includes: acrylic core/shell polymers; styrene-butadiene/methacrylate core/shell polymers; polyether polymers; carboxylated acrylonitrile/butadienes; and carboxylated butadienes. Advantages can be obtained from the provision of the chain extension agent in a composition with an epoxy resin even in the absence of a toughening agent as described above. However, particular advantage is achieved from the presence of the toughening agent or combinations of different agents, as previously suggested.

It will be appreciated that some of the described natural and synthetic rubbers will have unsaturation in the chain that can be crosslinked by the catalyst. Thus, the catalyst will polymerize the benzoxazine, and concurrently vulcanize the rubber to for a co-extensive network of poly(benzoxazine) and vulcanized rubber.

Various combinations of toughening agents can be used if desired. If used, a toughening agent is present in the resin blend in an amount of at least 3 percent by weight, or at least 5 percent by weight. If used, a toughening agent is present in a resin blend in an amount of no greater than 35 percent by weight, or no greater than 25 weight percent.

Other optional additives, or adjuvants, may be added to the compositions as desired. Examples of such other optional additives include as colorants, anti-oxidant stabilizers, thermal degradation stabilizers, light stabilizers, flow agents, bodying agents, flatting agents, inert fillers, binders, blowing agents, fungicides, bactericides, surfactants, plasticizers, rubber tougheners, and other additives known to those skilled in the art. Such additives are typically substantially unreactive. These adjuvants, if present, or other optional additives, are added in an amount effective for their intended purpose.

Examples of suitable filler materials include reinforcement-grade carbon black, fluoroplastics, clays, and any combination of any of these in any proportions.

The phrase "reinforcement-grade carbon black" as used herein, includes any carbon black with an average particle size smaller than about 10 microns. Some particularly suitable average particle sizes for reinforcement-grade carbon black range from about 9 nm to about 40 nm. Carbon black that is not reinforcement grade include carbon black with an average particle size larger than about 40 nm. Carbon nanotubes are also useful fillers. Carbon black fillers are typically employed as a means to balance, elongation, hardness, abrasion resistance, conductivity, and processibility of compositions. Suitable examples include MT blacks (medium thermal black) designated N-991, N-990, N-908, and N-907; FEF N-550; and large particle size furnace blacks.

Other useful fillers include diatomaceous earth, barium sulfate, talc, and calcium fluoride. The choice and amounts of optional components depend on the needs of the specific application.

Reaction conditions for curing the composition depend on the reactants and amounts used and can be determined by those skilled in the art. The curable compositions are made by mixing in any order at least one benzoxazine resin and at least one phthalonitrile resin, as described above. Generally, the composition is then heated to a temperature between about 50 and 300° C., preferably between about 130-250° C., for a time of about 1-360 minutes. Some blends containing a greater portion of phthalonitrile resin may require a post cure at temperatures up to 400° C. to achieve ultimate performance.

Suitable sources of heat to cure the compositions of the invention include induction heating coils, ovens, hot plates, heat guns, infrared sources including lasers, microwave sources. Suitable sources of light and radiation include ultraviolet light sources, visible light sources, and electron beam sources.

Solvents can be used as a processing aid. Useful solvents are lactones, such as gamma-butyrolactone, gamma-valerolactone; and epsilon-caprolactone; ketones such as acetone, methyl ethyl ketone, methyl isobutyl ketone, cyclopentanone and cyclohexanone; sulfones, such as tetramethylene sulfone, 3-methylsulfolane, 2,4-dimethylsulfolane, butadiene sulfone, methyl sulfone, ethyl sulfone, propyl sulfone, butyl sulfone, methyl vinyl sulfone, 2-(methylsulfonyl)ethanol, 2,2'-sulfonyldiethanol; sulfoxides, such as dimethyl sulfoxide; cyclic carbonates such as propylene carbonate, ethylene carbonate and vinylene carbonate; carboxylic acid esters such as ethyl acetate, methyl cellosolve acetate, methyl formate; and other solvents such as methylene chloride, nitromethane, acetonitrile, glycol sulfite and 1,2-dimethoxyethane (glyme).

Various embodiments are provided that include resin blends.

Embodiment 1 is a resin blend comprising a blend of a benzoxazine resin and a phthalonitrile resin.

Embodiment 2 is the resin blend of embodiment 1, wherein a weight ratio of the phthalonitrile resin to the benzoxazine resin ranges from 2:98 to 99:1, inclusive.

Embodiment 3 is the resin blend of embodiment 1 or embodiment 2, wherein a weight ratio of the phthalonitrile resin to the benzoxazine resin ranges from 5:95 to 96:4, inclusive.

Embodiment 4 is the resin blend of any of embodiments 1 to 3, wherein a weight ratio of the phthalonitrile resin to the benzoxazine resin ranges from 15:85 to 85:15, inclusive.

Embodiment 5 is the resin blend of any of embodiments 1 to 4, wherein the benzoxazine resin is of Formula I:

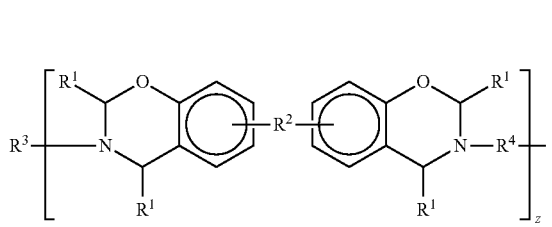

I wherein
each $R^1$ is H or an alkyl group, and is the residue of an aliphatic aldehyde,
$R^2$ is a covalent bond, or a polyvalent (hetero)hydrocarbyl group, preferably a covalent bond or a divalent alkyl group;
$R^3$ and $R^4$ are independently selected from the (hetero) hydrocarbyl residues of a primary amino compound; and
z is at least 1;
with the proviso that neither $R^3$ nor $R^4$ is of Formula III:

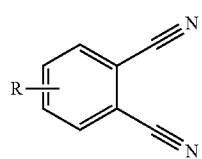

III where R is selected from a covalent bond, a C4-C20 alkyl chain, —NH, a phenol, biphenol, bisphenol, a polyvalent phenol, an imide, an ether, a thioether, amide, ester, or a polyvalent (hetero)hydrocarbyl residue.

Embodiment 6 is the resin blend of any of embodiments 1 to 4, wherein the benzoxazine resin is of Formula II:

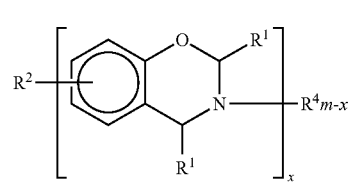

II wherein
each $R^1$ is H or an alkyl group, and is the residue of an aliphatic aldehyde,
$R^2$ is H, a covalent bond, a phenol or a polyvalent (hetero)hydrocarbyl group, preferably H, a covalent bond or a divalent alkyl group;
$R^4$ is a (hetero)hydrocarbyl residue of a primary amino compound, $R^4(NH_2)_m$, with the proviso that $R^4$ is not of Formula III:

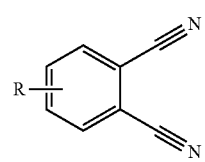

III where R is selected from, a covalent bond, a C4-C20 alkyl chain, —NH, a phenol, biphenol, bisphenol, a polyvalent phenol, an imide, an ether, a thioether, amide, ester, a polyvalent (hetero)hydrocarbyl residue;
where when $R^4$ is an aryl group, m is 1-4; and x is at least 1.

Embodiment 7 is the resin blend of any of embodiments 1 to 6, wherein the benzoxazine resin comprises a monofunctional benzoxazine.

Embodiment 8 is the resin blend of any of embodiments 1 to 6, wherein the benzoxazine resin comprises a multifunctional benzoxazine.

Embodiment 9 is the resin blend of any of embodiments 1 to 6, wherein the benzoxazine resin is derived from bisphenol A and aniline.

Embodiment 10 is the resin blend of any of embodiments 1 to 6, wherein the benzoxazine resin is derived from bisphenol F and aniline.

Embodiment 11 is the resin blend of any of embodiments 1 to 6, wherein the benzoxazine resin is derived from phenol and methylene dianiline.

Embodiment 12 is the resin blend of any of embodiments 1 to 6, wherein the benzoxazine resin is derived from phenol and aniline.

Embodiment 13 is the resin blend of any of embodiments 1 to 12, wherein the phthalonitrile resin is of Formula IV:

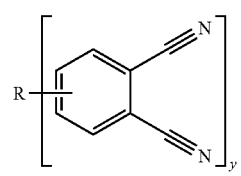

IV where R is selected from H, a covalent bond, —C(CH$_3$)$_3$, a C4-C20 alkyl chain, —NO$_2$, —NH$_2$, a phenol, biphenol, bisphenol, a polyvalent phenol, an imide, an ether, a thioether, amide, ester, a polyvalent (hetero)hydrocarbyl residue; and y is at least 1;

with the proviso that R is not of Formula V or Formula VI:

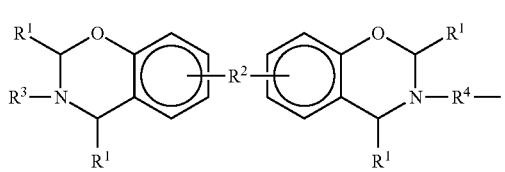

wherein each R$^1$ is H or an alkyl group, and is the residue of an aliphatic aldehyde, R$^2$ is a covalent bond, or a polyvalent (hetero)hydrocarbyl group, preferably a covalent bond or a divalent alkyl group;

R$^3$ and R$^4$ are independently selected from the (hetero)hydrocarbyl residues of a primary amino compound; and

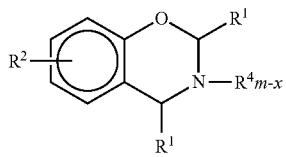

wherein each R$^1$ is H or an alkyl group, and is the residue of an aliphatic aldehyde, R$^2$ is H, a covalent bond, a phenol or a polyvalent (hetero)hydrocarbyl group, preferably H, a covalent bond or a divalent alkyl group;

R$^4$ is a (hetero)hydrocarbyl residue of a primary amino compound, R$^4$(NH$_2$)$_m$, where when R$^4$ is an aryl group, m is 1-4; and x is at least 1.

Embodiment 14 is the resin blend of embodiment 13, wherein R is a phenol.

Embodiment 15 is the resin blend of any of embodiments 1 to 13, wherein the phthalonitrile resin comprises a monofunctional phthalonitrile.

Embodiment 16 is the resin blend of any of embodiments 1 to 13, wherein the phthalonitrile resin comprises a multifunctional phthalonitrile.

Embodiment 17 is the resin blend of any of embodiments 1 to 13, wherein the phthalonitrile resin is derived from resorcinol and 4-nitrophthalonitrile.

Embodiment 18 is the resin blend of any of embodiments 1 to 13, wherein the phthalonitrile resin is derived from bisphenol M and 4-nitrophthalonitrile.

Embodiment 19 is the resin blend of any of embodiments 1 to 13, wherein the phthalonitrile resin is derived from bisphenol T and 4-nitrophthalonitrile.

Embodiment 20 is the resin blend of any of embodiments 1 to 13, wherein the phthalonitrile resin comprises an alkyl-functionalized 1,2-dicyanobenzene.

Embodiment 21 is the resin blend of any of embodiments 1 to 20, wherein the phthalonitrile resin has a melting temperature of 220° C. or less.

Embodiment 22 is the resin blend of any of embodiments 1 to 21, further comprising at least one additive.

Embodiment 23 is the resin blend of claim 22, wherein the at least one additive is selected from a catalyst, a curative, a toughener, a filler, and combinations thereof.

Embodiment 24 is the resin blend of embodiment 22 or embodiment 23, wherein the catalyst comprises a tosylate, a chalcogenide element or compound, a Bronsted acid, a metal, or a metal salt.

Embodiment 25 is the resin blend of any of embodiments 22 to 24, wherein the catalyst is present in an amount of between 0 and 40 percent by weight of the resin blend.

Embodiment 26 is the resin blend of any of embodiments 22 to 25, wherein the curative comprises a thiol or an amine.

Embodiment 27 is the resin blend of any of embodiments 22 to 26, wherein the curative comprises N-cyanoguanidine.

Embodiment 28 is the resin blend of any of embodiments 22 to 27, wherein the curative is present in an amount of between 0 and 40 percent by weight of the resin blend.

Embodiment 29 is the resin blend of any of embodiments 22 to 28, wherein the at least one additive comprises a toughener.

Embodiment 30 is the resin blend of any of embodiments 1 to 29, wherein the resin blend is a solid at 25° C.

Embodiment 31 is the resin blend of any of embodiments 1 to 29, wherein the resin blend is a fluid at 25° C.

Embodiment 32 is the resin blend of any of embodiments 1 to 31, further comprising a second benzoxazine resin.

Embodiment 33 is the resin blend of any of embodiments 1 to 32, further comprising a second phthalonitrile resin.

Embodiment 34 is the resin blend of any of embodiments 1 to 33, further comprising a third benzoxazine resin.

Embodiment 35 is the resin blend of any of embodiments 1 to 34, further comprising a third phthalonitrile resin.

EXAMPLES

Objects and advantages of this invention are further illustrated by the following examples, but the particular materials and amounts thereof recited in these examples, as well as other conditions and details, should not be construed to unduly limit this invention. These examples are for illustrative purposes only and are not meant to be limiting on the scope of the appended claims.

Unless otherwise noted, all chemicals used in the examples can be obtained from Sigma-Aldrich Corp. (Saint Louis, Mo.). Unless otherwise specified, all microbiological supplies and reagents were purchased as standard products from either Sigma-Aldrich or VWR.

| Name | Description |
|---|---|
| PdBZN | A benzoxazine derived from phenol and methylene dianiline; obtained as P-d type benzoxazine (Lot # 312014) from Shikoku Chemicals Corporation, Tokyo, Japan |
| BABZN | bis(3-phenyl-3,4-dihydro-2H,3-benzoxazinyl)isopropane, a benzoxazine derived from bisphenol A and aniline; obtained from Huntsman Advanced Materials, The Woodlands, TX, under trade designation "ARALDITE MT 35600" |

| Name | Description |
| --- | --- |
| BFBZN | A benzoxazine derived from bisphenol F and aniline; obtained from Huntsman Advanced Materials The Woodlands, TX, as "ARALDITE MT 35700" |
| PhBZN | A benzoxazine derived from phenol and aniline; obtained from Huntsman Advanced Materials, The Woodlands, TX, under trade designation "RD 2010-008" |
| RDPN | Resorcinol diphthalonitrile (i.e. bis(3,4-dicyanophenyl) ether of resorcinol) derived from the nucleophilic substitution reaction of 4-nitrophthalonitrile and resorcinol, synthesized according to Preparatory Example A. |
| BTDPN | Bisphenol T diphthalonitrile (i.e. bis(3,4-dicyanophenyl) ether of bisphenol T) derived from the nucleophilic substitution reaction of 4-nitrophthalonitrile and bisphenol T, synthesized according to Preparatory Example B. |
| BMDPN | Bisphenol M diphthalonitrile (i.e. bis(3,4-dicyanophenyl) ether of bisphenol M) derived from the nucleophilic substitution reaction of 4-nitrophthalonitrile and bisphenol M, synthesized according to Preparatory Example C. |
| DCB | 1,2-Dicyanobenzene (CAS No. 91-15-6); obtained from Sigma-Aldrich Chemical Company, St. Louis, MO |
| DICY | Dicyandiamide (N-cyanoguanidine) (CAS No. 461-58-5); obtained from Air Products and Chemicals Inc., Allentown, PA, under trade designation "AMICURE CG-1400" |

Methods:

Method of Measuring Cure Reaction Exotherm Via Differential Scanning Calorimeter (DSC)

A TA Instruments Q Series DSC (obtained from TA Instruments, New Castle, Del.) was used. Approximately 5 mg of resin was weighed into an aluminum DSC pan. The sample pan was loaded into the DSC instrument, and the heat flow of the sample was measured in a dynamic DSC measurement with a thermal ramp rate of either 1° C./min or 10° C./min.

Method of Measuring Stiffness (E') and Glass Transition Temperature (Tan δ Peak) Via Dynamic Mechanical Analyzer (DMA)

A TA Instruments Q Series DMA (obtained from TA Instruments, New Castle, Del.) was used. Dynamic mechanical measurements were performed using ether single cantilever beam geometry or tensile geometry. The low strain in-phase and out-of-phase deformation response was measured when applying an oscillatory controlled force with a controlled deformation amplitude of 20 um at a frequency of 1 Hz, and the resulting storage and loss moduli and loss tangent were calculated. The temperature was ramped at either 3° C./min or 5° C./min over a temperature range spanning the glass to rubber transition.

Method of Measuring Weight Loss Via Thermogravimetric Analysis (TGA)

A TA Instruments Q Series TGA (obtained from TA Instruments, New Castle, Del.) was used. Samples of approximately 5-10 mg were loaded on platinum pans into the TGA. The mass loss of the sample was measured under an air atmosphere and under a nitrogen atmosphere with a thermal ramp of 1° C./min.

Preparatory Example A (RDPN)

To a three necked 250 mL reaction flask was added 9 g (0.052 mol) of 4-nitrophthalonitrile, 2.86 g (0.26 mol) of resorcinol, 14.37 g (0.104 mol) of anhydrous $K_2CO_3$ and 90 g of dry DMSO) and stirred for 48 hours at room temperature under a nitrogen atmosphere. The reaction solution was poured into 300 mL of stirring deionized water leaving undissolved salts behind in the reaction flask. The precipitated product was collected on a Buchner funnel by suction filtration. The precipitate was added to 100 mL of methanol and stirred for 30 minutes to remove impurities. The solid product was collected a second time on a Buchner funnel by suction filtration and washed with 100 ml of methanol. The product was collected and dried in a convection oven at 120° C. The product, 8.5 g (90.3%), had a melt temperature of 185° C. and was identified as the desired compound by infrared analysis.

Preparatory Example B (BTDPN)

To a three necked 250 mL reaction flask was added 9 g (0.052 mol) of 4-nitrophthalonitrile, 5.67 g (0.26 mol) of bisphenol T, 14.37 g (0.104 mol) of anhydrous $K_2CO_3$ and 90 g of dry DMSO) and stirred for 48 hours at room temperature under a nitrogen atmosphere. The reaction solution was poured into 300 mL of stirring deionized water leaving undissolved salts behind in the reaction flask. The precipitated product was collected on a Buchner funnel by suction filtration. The precipitate was added to 100 mL of methanol and stirred for 30 minutes to remove impurities. The solid product was collected a second time on a Buchner funnel by suction filtration and washed with 100 ml of methanol. The product was collected and dried in a convection oven at 120° C. The product, 10.8 g (89.1%), had a melt temperature of 178° C. and was identified as the desired compound by infrared analysis.

Preparatory Example C (BMDPN)

To a three necked 250 mL reaction flask was added 9 g (0.052 mol) of 4-nitrophthalonitrile, 9.01 g (0.26 mol) of bisphenol M, 14.37 g (0.104 mol) of anhydrous $K_2CO_3$ and 90 g of dry DMSO) and stirred for 48 hours at room temperature under a nitrogen atmosphere. The reaction solution was poured into 300 mL of stirring deionized water leaving undissolved salts behind in the reaction flask. The precipitated product was collected on a Buchner funnel by suction filtration. The precipitate is added to 100 mL of methanol and stirred for 30 minutes to remove impurities. The solid product is collected a second time on a Buchner funnel by suction filtration and washed with 100 ml of methanol. The product was collected and dried in a convection oven at 120° C. The product, 14.21 g (91.3%), had a melt temperature of 158° C. and was identified as the desired compound by infrared analysis

Comparative Example A (CE-A)

For CE-A, 8.0 g of PdBZN (i.e., $PdBZN_{100}$) was melted at 190° C. in a flat bottom 70 mm diameter thin gauge aluminum pan. Approximately 30 mg of molten material was removed and quenched for DSC measurement of the cure reaction exotherm as described above. The remainder of the sample was then placed in an oven at 190° C. and was cured for 2 hours at 190° C. After curing the sample was cooled at 5° C./min to 40° C. and removed from the aluminum pan. The sample was hard and stiff. The aluminum pan was peeled away from the sample and was cut into strips for DMA measurement of the stiffness (E') and glass transition temperature (tan δ peak) in single cantilever beam geometry as described above. Additional small fragments (10-20 mg) of the cured material were used for weight loss measurements on a TA Instruments Q series TGA as described above.

Examples 1-4 (EX1-EX4)

For EX1, 7.2 g of PdBZN and 0.8 g of RDPN (i.e., $PdBZN_{90}/RDPN_{10}$ blend) were melted and blended at a temperature of 190° C. in a flat bottom 70 mm diameter thin gauge aluminum pan. Approximately 30 mg of blended material was removed and quenched for DSC measurement of the cure reaction exotherm as described above. The sample was then placed in an oven at 190° C. The sample was cured for 1 hour at 190° C., 1 hour at 220° C., 1 hour at 265° C., and 1 hour at 300° C. ramping at a rate of 3° C./min between set points. Then the sample was cooled at a rate of 5° C./min to 40° C. and removed from the aluminum pan. The sample was hard and stiff. The aluminum pan was peeled away from the sample. The sample was cut into strips for DMA measurement of the stiffness (E') and glass transition temperature (tan δ peak) in single cantilever beam geometry as described above. Additional small fragments (10-20 mg) of the cured material were used for weight loss measurements on a TGA. EX2-EX4 (i.e., $PdBZN_{75}/RDPN_{25}$ blend, $PdBZN_{50}/RDPN_{50}$ blend, $PdBZN_{25}/RDPN_{75}$ blend, respectively) were prepared and characterized in the same manner as EX 1 described above except that the ratio of PdBZN and RDPN were varied. In addition EX2 and EX3 samples were annealed at 350° C. for 30 min under a nitrogen atmosphere after curing while EX4 sample was annealed at 350° C. for 30 min and 400° C. for 30 min under a nitrogen atmosphere after curing.

The compositions and the characterization data for CE-A and EX1-EX4 are summarized in Table 1, below.

Comparative Example B (CE-B)

For CE-B, 4.31 g of BFBZN (i.e., $BFBZN_{100}$) was placed in a flat-bottomed thin gauge aluminum pan 70 mm diameter and melted at a temperature of 120° C. to mimic the thermal history of the blends. Approximately 30 mg of material was removed and quenched for DSC measurement of the cure reaction exotherm as described above. The sample was then placed in an air-circulating oven at 180° C. The sample was cured for 2 hours at 180° C., 1 hour at 210° C., and 1 hour at 240° C. ramping at a rate of 5° C./min between set points. The sample was allowed to cool at a rate of 20° C./min in the oven to 40° C. and then removed from the aluminum pan. The sample was dark red, transparent and glossy in appearance and mechanically hard and stiff. The sample was cut into strips with approximate dimensions of 40 mm×12 mm×1 mm for DMA measurement of the stiffness (E') and glass transition temperature (tan δ peak) in rectangular tension film geometry. Additional small fragments (10-20 mg) of the cured material were used for weight loss measurements as described above.

Examples 5-11 (EX5-EX11)

For EX5, 47.5 g of BFBZN and 2.50 g of BMDPN (i.e., $BFBZN_{95}/BMDPN_{5}$ blend) were ground together with a mortar and pestle at ambient temperature. The solid mixture was melted and blended at a temperature of 150° C. until a homogeneous solution was achieved. The mixture was cooled to ambient temperature and approximately 30 mg of blended material was removed for DSC measurement of the cure reaction as described above. Approximately 8.0 g the sample was then placed in an aluminum pan in an air-circulating oven at 150° C. The sample was cured for 2 hours at 150° C., 2 hours at 170° C., 2 hours at 190° C., 2 hours at 220° C. and 1 hour at 240° C. ramping at a rate of 5° C./min between set points. The sample was allowed to cool at a rate of 20° C./min in the oven to 40° C. and then removed from the aluminum pan. The sample was very dark red and glossy in appearance and mechanically hard and stiff. The sample was cut into strips with approximate dimensions of 40 mm×12 mm×3 mm for DMA measurement of the stiffness (E') and glass transition temperature (tan δ peak) in rectangular tension film geometry. Additional small fragments (10-20 mg) of the cured material were used for weight loss measurements as described above.

TABLE 1

| Example | Resin Blend | DSC (1° C./min ramp) | | DMA (cantilever, 3° C./min ramp) | | TGA (1° C./min ramp) | |
|---|---|---|---|---|---|---|---|
| | | 1st Peak Exotherm, ° C. | 2nd Peak Exotherm, ° C. | E' (25° C.), MPa | Tg (tan δ peak), ° C. | 5% wt loss ($N_2$), ° C. | 5% wt loss (air), ° C. |
| CE-A | $PdBZN_{100}/RDPN_{0}$ | 189 | — | 3460 | 209 | 324 | 372 |
| EX1 | $PdBZN_{90}/RDPN_{10}$ | — | — | 3378 | 291 | 351 | 399 |
| EX2 | $PdBZN_{75}/RDPN_{25}$ | 194 | 231 | 3910 | 379 | 373 | 408 |
| EX3 | $PdBZN_{50}/RDPN_{50}$ | 199 | 229 | 3580 | 400 | 401 | 423 |
| EX4 | $PdBZN_{25}/RDPN_{75}$ | 211 | 232 | 3400 | >450 | 409 | 452 |

EX6-EX11 (i.e., BFBZN$_{90}$/BMDPN$_{10}$ blend, BFBZN$_{75}$/BMDPN$_{25}$ blend, BFBZN$_{50}$/BMDPN$_{50}$ blend, BFBZN$_{25}$/BMDPN$_{75}$ blend, BFBZN$_{10}$/BMDPN$_{90}$ blend, BFBZN$_{4}$/BMDPN$_{96}$ blend, respectively) were prepared and characterized in the same manner as EX 5 described above except that the ratio of PFBZN and BMDPN was varied as described in Table 2, below. In addition, melting temperatures and the curing cycles of the EX6-EX11 were varied as follows:

EX6 sample was melted at 170° C. and then placed in an air-circulating oven at 150° C. The sample was cured for 2 hours at 150° C., 2 hours at 170° C., 2 hours at 190° C., 2 hours at 220° C. and 2 hours at 250° C. ramping at a rate of 5° C./min between set points. The sample was black and glossy in appearance and mechanically hard and stiff.

EX7 and EX8 samples were melted at 120° C. and then placed in an air-circulating oven at 180° C. The samples were cured for 2 hours at 180° C., 1 hour at 210° C., and 1 hour at 240° C. ramping at a rate of 5° C./min between set points. The EX7 and EX8 samples were black and glossy in appearance and mechanically hard and stiff.

EX9 sample was melted at 170° C. and then placed in an air-circulating oven at 150° C. The samples were cured for 2 hours at 150° C., 2 hours at 170° C., 2 hours at 190° C., 2 hours at 220° C. and 2 hours at 250° C. and 1 hour at 300° C. ramping at a rate of 5° C./min between set points. The sample was black and glossy in appearance and mechanically hard and stiff. A visual inspection of the sample revealed a thin skin material that thermally softened at a lower temperature than the lower bulk. The skin was removed with light sanding before dynamic mechanical measurement.

EX10 sample was melted at 160° C. and then placed in an air-circulating oven at 190° C. The sample was cured for 1 hour at 190° C., 1 hour at 220° C. and 4 hours at 250° C. ramping at a rate of 3° C./min between set points. A visual inspection of the sample revealed a thin skin material that thermally softened at a lower temperature than the lower bulk. The skin was removed with light sanding before dynamic mechanical measurement.

EX11 sample was melted at 160° C. and then placed in an air-circulating oven at 190° C. The sample was cured for 1 hour at 190° C., 1 hour at 220° C. and 4 hours at 265° C. ramping at a rate of 3° C./min between set points.

The compositions and the characterization data for CE-B and EX5-EX11 are summarized in Table 2, below.

Example 12 (EX12)

For EX12, 6.0 g of PdBZN and 2.0 g of BTDPN (i.e., PdBZN$_{75}$/BTDPN$_{25}$ blend) were melted and blended at a temperature of 190° C. in a flat bottom 70 mm diameter thin gauge aluminum pan. Approximately 30 mg of blended material was removed and quenched for DSC measurement of the cure reaction exotherm. The sample was then placed in an oven at 190° C. and then cured for 1 hour at 190° C., 1 hour at 220° C., 1 hour at 265° C., and 1 hour at 300° C. ramping at rate of 3° C./min between set points. The sample was annealed at 350° C. for 30 min under a nitrogen atmosphere and cooled at a rate of 5° C./min to 40° C. The sample was hard and stiff. The aluminum pan was peeled away from the sample. The sample was cut into strips for DMA measurement of the stiffness (E') and glass transition temperature (tan δ peak) in single cantilever beam geometry. Additional small fragments (10-20 mg) of the cured material were used for weight loss measurements as described above.

Example 13 (EX13)

For EX13, 6.0 g of PdBZN and 2.0 g of BMDPN (i.e., PdBZN$_{75}$/BMDPN$_{25}$ blend) were melted and blended at a temperature of 160° C. in a flat bottom 70 mm diameter thin gauge aluminum pan. Approximately 30 mg of blended material was removed and quenched for DSC measurement of the cure reaction exotherm. The sample was then placed in an oven at 190° C. and then cured for 1 hour at 190° C., 1 hour at 220° C., 1 hour at 265° C., and 1 hour at 300° C. to anneal ramping 3° C./min between set points. The sample was cooled at a rate of 5° C./min to 40° C. The sample was hard and stiff. The aluminum pan was peeled away from the sample. The sample was cut into strips for DMA measurement of the stiffness (E') and glass transition temperature (tan δ peak) in single cantilever beam geometry. Additional small fragments (10-20 mg) of the cured material were used for weight loss measurements as described above.

Table 3, below summarizes the compositions and the characterization data for EX2, EX12, and EX13.

TABLE 2

| Example | Resin Blend | DSC (10° C./min ramp) | | DMA (tension, 5° C./min ramp) | | TGA (1° C./min ramp) | |
|---|---|---|---|---|---|---|---|
| | | 1$^{st}$ Peak Exotherm, ° C. | 2$^{nd}$ Peak Exotherm, ° C. | E' (25° C.), MPa | Tg (tan δ peak), ° C. | 5% wt loss (N$_2$), ° C. | 5% wt loss (air), ° C. |
| CE-B | BFBZN$_{100}$/BMDPN$_{0}$ | 233 | — | 5099 | 180 | — | 321 |
| EX5 | BFBZN$_{95}$/BMDPN$_{5}$ | 227 | — | 2348 | 194 | — | 326 |
| EX6 | BFBZN$_{90}$/BMDPN$_{10}$ | 234 | — | 4480 | 196 | — | 342 |
| EX7 | BFBZN$_{75}$/BMDPN$_{25}$ | 238 | 305 | 2897 | 245 | — | 359 |
| EX8 | BFBZN$_{50}$/BMDPN$_{50}$ | 248 | 300 | 5299 | 286 | — | 400 |
| EX9 | BFBZN$_{25}$/BMDPN$_{75}$ | 256 | 305 | 3703 | 289 | — | 419 |
| EX10* | BFBZN$_{10}$/BMDPN$_{90}$ | 139 | 270 | 4425 | 273 | — | 416 |
| EX11* | BFBZN$_{4}$/BMDPN$_{96}$ | 260 | 305 | 3250 | 222 | — | 435 |

*DMA data for EX10 and EX11 were obtained in single cantilever geometry.

TABLE 3

| Example | Resin Blend | DSC (1° C./min ramp) | | DMA (cantilever, 3° C./min ramp) | | TGA (1° C./min ramp) | |
|---|---|---|---|---|---|---|---|
| | | 1st Peak Exotherm, ° C. | 2nd Peak Exotherm, ° C. | E' (25° C.), MPa | Tg (tan δ peak) ° C. | 5% wt loss ($N_2$), ° C. | 5% wt loss (air), ° C. |
| EX2 | $PdBZN_{75}/RDPN_{25}$ | 194 | 231 | 3910 | 380 | 373 | 408 |
| EX12 | $PdBZN_{75}/BTDPN_{25}$ | 195 | 234 | 3760 | 374 | 375 | 413 |
| EX13 | $PdBZN_{75}/BMDPN_{25}$ | 197 | 245 | 3570 | 305 | 372 | 410 |

Example 14 (EX14)

For EX14, 3.36 g of BABZN and 1.12 g of BMDPN (i.e., $BABZN_{75}/BMDPN_{25}$ blend) were ground together with a mortar and pestle at ambient temperature and transfer to a flat-bottomed thin gauge aluminum pan 70 mm diameter. The solid mixture was melted and blended at a temperature of 120° C. in a flat bottom 70 mm diameter thin gauge aluminum pan until a homogeneous solution was obtained. Approximately 30 mg of blended material was removed and quenched for DSC measurement of the cure reaction exotherm. The sample was then placed in an oven at 180° C. and then cured for 2 hours at 180° C., 1 hour at 210° C., 1 hour at 240° C. ramping at rate of 5° C./min between set points. The sample was cooled at a rate of 20° C./min to 40° C. The sample was black and glossy in appearance and mechanically hard and stiff. The aluminum pan was peeled away from the sample. The sample was cut into strips with approximate dimensions of 40 mm×12 mm×1 mm for DMA measurement of the stiffness (E') and glass transition temperature (tan δ peak) in single cantilever beam geometry. Additional small fragments (10-20 mg) of the cured material were used for weight loss measurements as described above.

Example 15 (EX15)

For EX15, 2.52 g of PhBZN and 0.75 g of BMDPN (i.e., $PhBZN_{77}/BMDPN_{23}$ blend) were melted and blended at a temperature of 160° C. in a flat bottom 70 mm diameter thin gauge aluminum pan. Approximately 30 mg of blended material was removed and quenched for DSC measurement of the cure reaction exotherm. The sample was then placed in an oven at 180° C. and then cured for 2 hours at 180° C., 2 hours at 220° C., 1 hour at 250° C. at a ramping at rate of 5° C./min between set points. The sample was cooled at a rate of 20° C./min to 40° C. The sample was black and glossy in appearance and mechanically hard and stiff. The aluminum pan was peeled away from the sample. The sample was cut into strips with approximate dimensions of 40 mm×12 mm×1 mm for DMA measurement of the stiffness (E') and glass transition temperature (tan δ peak) in single cantilever beam geometry. Additional small fragments (10-20 mg) of the cured material were used for weight loss measurements as described above.

Table 4, below summarizes the compositions and the characterization data for EX7 and EX13-EX15.

TABLE 4

| Example | Resin Blend | DSC (1° C./min ramp) | | DMA (cantilever, 3° C./min ramp) | | TGA (1° C./min ramp) | |
|---|---|---|---|---|---|---|---|
| | | 1st Peak Exotherm, ° C. | 2nd Peak Exotherm, ° C. | E' (25° C.), MPa | Tg (tan δ peak) ° C. | 5% wt loss ($N_2$), ° C. | 5% wt loss (air), ° C. |
| EX7 | $BFBZN_{75}/BMDPN_{25}$ | 191 | 246 | 4458 | 245 | — | 359 |
| EX13 | $PdBZN_{75}/BMDPN_{25}$ | 197 | 245 | 3570 | 305 | 372 | 410 |
| EX14 | $BABZN_{75}/BMDPN_{25}$ | 198 | 250 | 4738 | 258 | — | 338 |
| EX15 | $PhBZN_{77}/BMDPN_{23}$ | 178 | 239 | 4676 | 206 | — | 343 |

Comparative Example C (CE-C)

For CE-C, 5.16 g of BABZN (i.e., $BABZN_{100}$) was placed in in a flat-bottomed thin gauge aluminum pan 70 mm diameter and melted at a temperature of 120° C. to mimic the thermal history of the blends. Approximately 30 mg of material was removed and quenched for DSC measurement of the cure reaction exotherm as described above. The sample was then placed in an air-circulating oven at 180° C. and then cured for 2 hours at 180° C., 1 hour at 210° C., and 1 hour at 240° C. at a ramping at rate of 3° C./min between set points. The sample was allowed to cool at a rate of 20° C./min in the oven to 40° C. and then removed from the aluminum pan. The sample was dark red, transparent and glossy in appearance and mechanically hard and stiff. The sample was cut into strips with approximate dimensions of 40 mm×12 mm×1 mm for DMA measurement of the stiffness (E') and glass transition temperature (tan δ peak) in rectangular tension film geometry. Additional small fragments (10-20 mg) of the cured material were used for weight loss measurements as described above.

Comparative Example D (CE-D)

For CE-D, 10.2 g of PhBZN (i.e., $PhBZN_{100}$) was placed in a flat-bottomed thin gauge aluminum pan 70 mm in diameter. The solid mixture was melted at a temperature of 140° C. to mimic the thermal history of the blends. Approximately 30 mg of blended material was removed and quenched for DSC measurement of the cure reaction exotherm as described above. The sample was then placed in an air-circulating oven at 180° C. The sample was cured for 2 hours at 180° C., 2 hours at 220° C., and 1 hour at 250° C. at a ramping at rate of 5° C./min between set points. The sample was allowed to cool at a rate of 20° C./min in the oven to 40° C. and then removed from the aluminum pan. The sample was dark red, transparent and glossy in appearance and mechanically hard and stiff but had many large voids. The severe voiding prohibited DMA measurement of the sample. Small fragments (10-20 mg) of the cured material were used for weight loss measurements as described above.

Example 16 (EX16)

For EX16, 7.00 g of BABZN and 1.01 g of DCB (i.e., $BABZN_{87.5}/DCB_{12.5}$ blend) were ground together with a mortar and pestle at ambient temperature and transferred to a flat-bottomed thin gauge aluminum pan 70 mm diameter. The solid mixture was melted and blended at a temperature of 140° C. until a homogeneous solution was achieved. Approximately 30 mg of blended material was removed and quenched for DSC measurement of the cure reaction exotherm as described above. The sample was then placed in an air-circulating oven at 180° C. The sample was cured for 2 hours at 180° C., 2 hours at 220° C., and 1 hour at 250° C. at a ramping at rate of 5° C./min between set points. The sample was allowed to cool at a rate of 20° C./min in the oven to 40° C. and then removed from the aluminum pan. The sample was black and glossy in appearance and mechanically hard and stiff. The sample was cut into strips with approximate dimensions of 40 mm×12 mm×1 mm for DMA measurement of the stiffness (E') and glass transition temperature (tan δ peak) in three point bend geometry. Additional small fragments (10-20 mg) of the cured material were used for weight loss measurements as described above.

Example 17 (EX 17)

For EX17, 30.00 g of BFBZN, 20.00 g of PhBZN, 5.00 g of BMDPN, and 0.50 g of DICY (i.e., $BFBZN_{60}/PhBZN_{30}/$ $BMDPN_{10}$ blend) were ground together with a mortar and pestle at ambient temperature. The solid mixture was melted and blended at a temperature of 150° C. until a homogeneous solution was achieved. The mixture was cooled to ambient temperature and approximately 30 mg of blended material was removed for DSC measurement of the cure reaction exotherm as described above. Approximately 8.0 g the sample was then placed in an aluminum pan in an air-circulating oven at 150° C. The sample was cured for 2 hours at 150° C., 2 hours at 170° C., 2 hours at 190° C., 2 hours at 220° C. and 1 hour at 240° C. at a ramping at rate of 5° C./min between set points. The sample was allowed to cool at a rate of 20° C./min in the oven to 40° C. and then removed from the aluminum pan. The sample was red-black and glossy in appearance and mechanically hard and stiff. The sample was cut into strips with approximate dimensions of 40 mm×12 mm×3 mm for DMA measurement of the stiffness (E') and glass transition temperature (tan δ peak) in rectangular tension film geometry. Additional small fragments (10-20 mg) of the cured material were used for weight loss measurements as described above.

Example 18 (Ex 18)

For EX18, 0.48 g of BFBZN, 5.02 g of BMDPN and 2.50 g of RDPN (i.e., $BFBZN_6/BMDPN_{63}/RDPN_{31}$ blend) were melted and blended at a temperature of 190° C. in a flat bottom 70 mm diameter thin gauge aluminum pan. Approximately 30 mg of blended material was removed and quenched for DSC measurement of the cure reaction exotherm as described above. The sample was then placed in an oven at 190° C. The sample was cured for 1 hour at 190° C., 1 hour at 220° C., 1 hour at 265° C., and 1 hour at 300° C. ramping 3° C./min between set points. The sample was annealed at 350° C. for 30 min and 400° C. for 30 min under a nitrogen atmosphere and cooled at a rate of 5° C./min to 40° C. The sample was hard and stiff. The aluminum pan was peeled away from the sample. The sample was cut into strips for DMA measurement of the stiffness (E') and glass transition temperature (tan δ peak) in single cantilever beam geometry. Additional small fragments (10-20 mg) of the cured material were used for weight loss measurements as described above.

Table 5, below summarizes the compositions and the characterization data for CE-C, CE-D, and EX15-EX18.

TABLE 5

| Example | Resin Blend | DSC (1° C./min ramp) | | DMA (cantilever, 3° C./min ramp) | | TGA (1° C./min ramp) |
|---|---|---|---|---|---|---|
| | | 1st Peak Exotherm, ° C. | 2nd Peak Exotherm, ° C. | E' (25° C.), MPa | Tg (tan δ peak), ° C. | 5% wt loss in air, ° C. |
| CE-C | $BABZN_{100}$ | 241 | — | 4982 | 163 | 300 |
| CE-D | $PhBZN_{100}$ | 175 | — | — | — | 330 |
| EX15 | $PnBZN_{77}/BMDPN_{23}$ | 178 | 239 | 4676 | 206 | 343 |
| EX16 | $BABZN_{87.5}/DCB_{12.5}$ | 192 | — | 4210 | 194 | 336 |
| EX17 | $BFBZN_{60}/PhBZN_{30}/BMDPN_{10}$ | 175 | 226 | 3841 | 186 | 329 |
| EX18 | $BFBZN_6/BMDPN_{63}/RPN_{31}$ | 182 | 246 | 3150 | 274 | 441 |

While the specification has described in detail certain exemplary embodiments, it will be appreciated that those skilled in the art, upon attaining an understanding of the foregoing, may readily conceive of alterations to, variations of, and equivalents to these embodiments. Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:

1. A resin blend comprising a blend of a benzoxazine resin and a phthalonitrile resin, wherein the benzoxazine resin is of Formula I or Formula II:

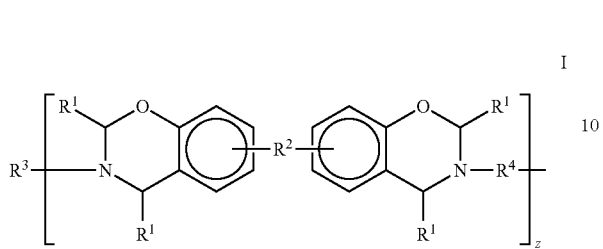

wherein
each $R^1$ is H or an alkyl group, and is the residue of an aliphatic aldehyde,
$R^2$ is a covalent bond, or a polyvalent (hetero)hydrocarbyl group;
$R^3$ and $R^4$ are independently selected from the (hetero)hydrocarbyl residues of a primary amino compound; and
z is at least 1;
with the proviso that neither $R^3$ nor $R^4$ is of Formula III:

where R is selected from a covalent bond, a C4-C20 alkyl chain, —NH, a phenol, biphenol, bisphenol, a polyvalent phenol, an imide, an ether, a thioether, amide, ester, or a polyvalent (hetero)hydrocarbyl residue;

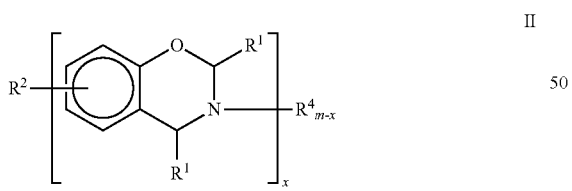

wherein
each $R^1$ is H or an alkyl group, and is the residue of an aliphatic aldehyde,
$R^2$ is H, a covalent bond, a phenol or a polyvalent (hetero)hydrocarbyl group;
$R^4$ is a (hetero)hydrocarbyl residue of a primary amino compound, $R^4(NH_2)_m$, with the proviso that $R^4$ is not of Formula III above;
where when $R^4$ is an aryl group, m is 1-4; and x is at least 1; and wherein the phthalonitrile resin is of Formula IV:

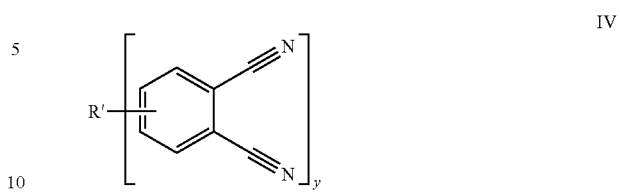

where R' is selected from H, a covalent bond, —C(CH$_3$)$_3$, a C4-C20 alkyl chain, —NO$_2$, —NH$_2$, a phenol, biphenol, bisphenol, a polyvalent phenol, an imide, an ether, a thioether, amide, ester, a polyvalent (hetero)hydrocarbyl residue; and y is at least 1;
with the proviso that R' is not of Formula V or Formula VI:

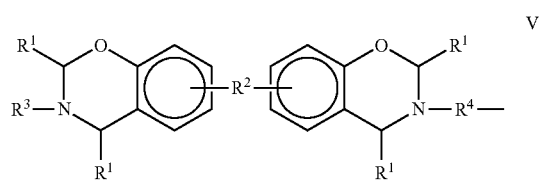

wherein
each $R^1$ is H or an alkyl group, and is the residue of an aliphatic aldehyde,
$R^2$ is a covalent bond, or a polyvalent (hetero)hydrocarbyl group;
$R^3$ and $R^4$ are independently selected from the (hetero)hydrocarbyl residues of a primary amino compound; and

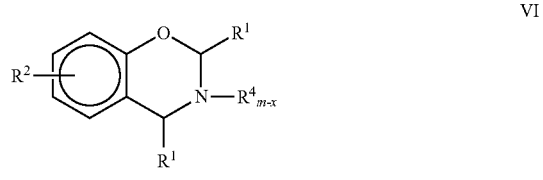

wherein
each $R^1$ is H or an alkyl group, and is the residue of an aliphatic aldehyde,
$R^2$ is H, a covalent bond, a phenol or a polyvalent (hetero)hydrocarbyl group;
$R^4$ is a (hetero)hydrocarbyl residue of a primary amino compound, $R^4(NH_2)_m$, where when $R^4$ is an aryl group, m is 1-4; and x is at least 1.

2. The resin blend of claim 1, wherein a weight ratio of the phthalonitrile resin to the benzoxazine resin ranges from 2:98 to 99:1, inclusive.

3. The resin blend of claim 1, wherein a weight ratio of the phthalonitrile resin to the benzoxazine resin ranges from 15:85 to 85:15, inclusive.

4. The resin blend of claim 1, wherein the benzoxazine resin is of Formula I
and wherein $R^2$ is a covalent bond or a divalent alkyl group.

5. The resin blend of claim 1, wherein the benzoxazine resin is of Formula II
and wherein $R^2$ is H, a covalent bond or a divalent alkyl group.

6. The resin blend of claim 1, wherein the phthalonitrile resin comprises a multifunctional phthalonitrile.

7. The resin blend of claim 1, wherein in Formula IV, R' is a phenol.

8. The resin blend of claim 1, wherein the phthalonitrile resin has a melting temperature of 220° C. or less.

9. The resin blend of claim 1, further comprising at least one additive selected from a catalyst, a curative, a toughener, a filler, and combinations thereof.

10. The resin blend of claim 9, wherein the curative comprises a thiol or an amine.

11. The resin blend of claim 9, wherein the curative comprises N-cyanoguanidine.

12. The resin blend of claim 1, further comprising a second benzoxazine resin.

13. The resin blend of claim 1, further comprising a second phthalonitrile resin.

* * * * *

UNITED STATES PATENT AND TRADEMARK OFFICE
CERTIFICATE OF CORRECTION

PATENT NO. : 10,556,991 B2
APPLICATION NO. : 15/772108
DATED : February 11, 2020
INVENTOR(S) : Benjamin Anderson et al.

Page 1 of 1

It is certified that error appears in the above-identified patent and that said Letters Patent is hereby corrected as shown below:

On the Title Page

Item (56), Column 2,
Under Other Publications, Line 2, Delete "p." and insert -- pp. --, therefor.

In the Specification

Column 1,
Line 4, delete "To" and insert -- TO --, therefor.

Column 16,
Line 21, delete "Ss" and insert -- $S_8$ --, therefor.

Column 17,
Line 44, delete "tris(β" and insert -- tris(3 --, therefor.
Line 45, delete "(β" and insert -- (3 --, therefor.

Column 24,
Lines 53-57, delete "Unless otherwise noted, all chemicals used in the examples can be obtained from Sigma-Aldrich Corp. (Saint Louis, MO). Unless otherwise specified, all microbiological supplies and reagents were purchased as standard products from either Sigma-Aldrich or VWR." and insert the same on Column 24, Line 52 as a continuation of the same paragraph.

Signed and Sealed this
Seventh Day of April, 2020

Andrei Iancu
*Director of the United States Patent and Trademark Office*